(12) United States Patent
Dua

(10) Patent No.: US 10,154,306 B2
(45) Date of Patent: *Dec. 11, 2018

(54) METHOD, APPARATUS, AND SYSTEM FOR STREAMING DATA WITH BIOMETRIC VERIFICATION

(71) Applicant: SYNDEFENSE CORP., Kanagawa (JP)

(72) Inventor: Robin Dua, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,894

(22) Filed: Dec. 18, 2014

(65) Prior Publication Data

US 2015/0113623 A1 Apr. 23, 2015

Related U.S. Application Data

(63) Continuation of application No. 13/947,367, filed on Jul. 22, 2013, which is a continuation of application (Continued)

(51) Int. Cl.
*H04L 29/06* (2006.01)
*H04N 21/4415* (2011.01)
(Continued)

(52) U.S. Cl.
CPC ... *H04N 21/4415* (2013.01); *H04L 29/06027* (2013.01); *H04L 29/1216* (2013.01);
(Continued)

(58) Field of Classification Search
CPC .......... G06F 3/048; G06F 21/32; G06F 21/31; G06F 19/00; H04L 12/2816;
(Continued)

(56) References Cited

U.S. PATENT DOCUMENTS 5,659,367 A    8/1997    Yuen
5,742,905 A    4/1998    Pepe et al.
(Continued)

FOREIGN PATENT DOCUMENTS

WO    2003053060 A1    6/2003
WO    WO03/053060 A1 *    6/2003    ............. H04N 7/173
WO    2006052176    5/2006

OTHER PUBLICATIONS

Barlow—HDTV Past, Present, and Future—Part I History; Audioholics—May 31, 2005.
(Continued)

*Primary Examiner* — Farid Homayounmehr
*Assistant Examiner* — Lizbeth Torres-Diaz
(74) *Attorney, Agent, or Firm* — Stanzione & Associates, PLLC; Patrick Stanzione

(57) ABSTRACT

A device, system, and method for streaming data over a data network based on biometric verification. A computing device includes a wireless transceiver configured to communicate wirelessly with a data network, a user interface configured to receive a user input to stream data between a streaming device and the computing device in communication with the data network, and a biometric characteristic reader configured to receive user characteristic data to verify a user's identity. The computing device is configured to stream the data between the streaming device and the computing device via the wireless transceiver and the data network based on verification of the user's identity.

23 Claims, 7 Drawing Sheets

Related U.S. Application Data

No. 12/623,422, filed on Nov. 22, 2009, now Pat. No. 8,572,257, which is a continuation of application No. 11/341,715, filed on Jan. 27, 2006, now Pat. No. 7,624,417.

(51) Int. Cl.

| | |
|---|---|
| *H04L 29/12* | (2006.01) |
| *H04N 5/76* | (2006.01) |
| *H04N 7/16* | (2011.01) |
| *H04N 7/173* | (2011.01) |
| *H04N 21/41* | (2011.01) |
| *H04N 21/4147* | (2011.01) |
| *H04N 21/432* | (2011.01) |
| *H04N 21/436* | (2011.01) |
| *H04N 21/61* | (2011.01) |
| *H04N 21/4363* | (2011.01) |
| *H04N 21/462* | (2011.01) |
| *H04W 12/06* | (2009.01) |
| *H04N 21/422* | (2011.01) |
| *H04N 21/44* | (2011.01) |
| *H04N 21/4402* | (2011.01) |
| *H04N 21/472* | (2011.01) |
| *H04L 29/08* | (2006.01) |
| *H04N 5/44* | (2011.01) |
| *H04N 21/258* | (2011.01) |
| *H04N 21/478* | (2011.01) |

(52) U.S. Cl.
CPC ...... *H04L 29/12066* (2013.01); *H04L 61/106* (2013.01); *H04L 61/157* (2013.01); *H04L 61/1511* (2013.01); *H04L 63/083* (2013.01); *H04L 63/0861* (2013.01); *H04L 63/10* (2013.01); *H04L 65/1006* (2013.01); *H04L 65/60* (2013.01); *H04L 67/306* (2013.01); *H04N 5/4403* (2013.01); *H04N 5/76* (2013.01); *H04N 7/163* (2013.01); *H04N 7/17309* (2013.01); *H04N 21/25875* (2013.01); *H04N 21/25891* (2013.01); *H04N 21/4135* (2013.01); *H04N 21/4147* (2013.01); *H04N 21/42221* (2013.01); *H04N 21/4325* (2013.01); *H04N 21/43615* (2013.01); *H04N 21/43635* (2013.01); *H04N 21/43637* (2013.01); *H04N 21/44004* (2013.01); *H04N 21/440218* (2013.01); *H04N 21/4622* (2013.01); *H04N 21/478* (2013.01); *H04N 21/47202* (2013.01); *H04N 21/6125* (2013.01); *H04N 21/6187* (2013.01); *H04W 12/06* (2013.01); *H04N 2005/4426* (2013.01); *H04N 2005/4444* (2013.01); *H04N 2201/3233* (2013.01)

(58) Field of Classification Search
CPC ........... H04L 12/282; H04L 2012/2841; H04L 63/0861; H04L 67/306; H04L 63/08
USPC .......... 726/2, 26–27; 713/170–172, 168, 186
See application file for complete search history.

(56) References Cited

U.S. PATENT DOCUMENTS

| | | | |
|---|---|---|---|
| 5,862,325 A | 1/1999 | Reed et al. | |
| 5,990,883 A | 11/1999 | Byrne et al. | |
| 6,003,041 A | 12/1999 | Wugofski | |
| 6,028,950 A | 2/2000 | Merjanian | |
| 6,088,051 A | 7/2000 | Barraud | |
| 6,133,910 A | 10/2000 | Stinebruner | |
| 6,211,901 B1 | 4/2001 | Imajima et al. | |
| 6,233,389 B1 | 5/2001 | Barton et al. | |
| 6,239,793 B1 | 5/2001 | Barnert et al. | |
| 6,434,747 B1 | 8/2002 | Khoo et al. | |
| 6,529,969 B1 | 3/2003 | Inoue | |
| 6,539,077 B1 | 3/2003 | Ranalli et al. | |
| 6,600,520 B1 | 7/2003 | Ward et al. | |
| 6,611,654 B1 | 8/2003 | Shteyn | |
| 6,681,252 B1 | 1/2004 | Schuster et al. | |
| 6,744,967 B2 | 6/2004 | Kaminski et al. | |
| 6,748,057 B2 | 6/2004 | Ranalli et al. | |
| 6,782,412 B2 | 8/2004 | Brophy et al. | |
| 6,788,676 B2 | 9/2004 | Partanen et al. | |
| 6,792,449 B2 | 9/2004 | Colville et al. | |
| 6,810,413 B1 | 10/2004 | Rajakarunanayake et al. | |
| 6,816,724 B1 | 11/2004 | Asikainen | |
| 6,829,582 B1 | 12/2004 | Barsness | |
| 6,829,648 B1 | 12/2004 | Jones et al. | |
| 6,850,252 B1 | 2/2005 | Hoffberg | |
| 6,853,894 B1 | 2/2005 | Kolls | |
| 6,912,577 B1 | 6/2005 | Sabatier et al. | |
| 6,912,600 B2 | 6/2005 | Van Brero et al. | |
| 6,914,964 B1 | 7/2005 | Levine | |
| 6,985,190 B1 | 1/2006 | Klopfenstein et al. | |
| 6,993,787 B1 | 1/2006 | Kamel et al. | |
| 7,100,186 B1 | 8/2006 | Minakawa et al. | |
| 7,194,753 B1 | 3/2007 | Fries et al. | |
| 7,202,915 B2 | 4/2007 | Desch | |
| 7,206,501 B2 | 4/2007 | Yap et al. | |
| 7,224,404 B2 * | 5/2007 | An | H04N 5/4401 345/204 |
| 7,251,255 B1 | 7/2007 | Young | |
| 7,313,806 B1 | 12/2007 | Williams et al. | |
| 7,424,279 B1 | 9/2008 | Welk et al. | |
| 7,493,648 B2 | 2/2009 | Hisamatsu et al. | |
| 7,546,623 B2 | 6/2009 | Ramraz et al. | |
| 7,567,793 B1 | 7/2009 | Saito et al. | |
| 7,624,417 B2 | 11/2009 | Dua | |
| 7,634,296 B2 | 12/2009 | Haeusel | |
| 7,778,520 B1 | 8/2010 | Virden et al. | |
| 7,904,580 B2 | 3/2011 | Mandera et al. | |
| 7,929,056 B2 | 4/2011 | Tang et al. | |
| 8,156,527 B2 | 4/2012 | Walter et al. | |
| 8,166,504 B2 | 4/2012 | Kang et al. | |
| 8,453,181 B1 | 5/2013 | Johnson et al. | |
| 8,621,517 B2 | 12/2013 | Williams et al. | |
| 8,893,199 B2 | 11/2014 | Grannan | |
| 9,319,616 B2 | 4/2016 | Chang et al. | |
| 2002/0040475 A1 | 4/2002 | Yap et al. | |
| 2002/0097164 A1 | 7/2002 | Takagi et al. | |
| 2002/0120932 A1 * | 8/2002 | Schwalb | H04L 12/2805 725/37 |
| 2002/0174270 A1 | 11/2002 | Stecyk et al. | |
| 2002/0174444 A1 | 11/2002 | Gatto et al. | |
| 2002/0176404 A1 | 11/2002 | Girard | |
| 2002/0188948 A1 | 12/2002 | Florence | |
| 2003/0040293 A1 | 2/2003 | Fish et al. | |
| 2003/0055689 A1 * | 3/2003 | Block | G06Q 20/206 705/5 |
| 2003/0061605 A1 | 3/2003 | Genevois et al. | |
| 2003/0088400 A1 | 5/2003 | Nishio et al. | |
| 2003/0135860 A1 | 7/2003 | Dureau | |
| 2003/0154482 A1 | 8/2003 | Tsukamoto et al. | |
| 2003/0170007 A1 | 9/2003 | Namatame | |
| 2003/0202776 A1 | 10/2003 | Kendall et al. | |
| 2004/0013406 A1 | 1/2004 | Barton et al. | |
| 2004/0024660 A1 | 2/2004 | Ganesh et al. | |
| 2004/0055446 A1 | 3/2004 | Robbin et al. | |
| 2004/0116074 A1 | 6/2004 | Fujii et al. | |
| 2004/0117269 A1 | 6/2004 | Karaoguz et al. | |
| 2004/0117853 A1 | 6/2004 | Karaoguz et al. | |
| 2004/0174863 A1 | 9/2004 | Caspi et al. | |
| 2004/0176032 A1 | 9/2004 | Kotola et al. | |
| 2004/0224638 A1 | 11/2004 | Fadell et al. | |
| 2004/0234240 A1 | 11/2004 | Kurosawa et al. | |
| 2004/0250273 A1 | 12/2004 | Swix et al. | |
| 2004/0255326 A1 | 12/2004 | Hicks et al. | |
| 2005/0038718 A1 | 2/2005 | Barnes et al. | |
| 2005/0047426 A1 | 3/2005 | Aaltonen et al. | |
| 2005/0076364 A1 | 4/2005 | Dukes et al. | |
| 2005/0076388 A1 | 4/2005 | Morse et al. | |

(56) References Cited

U.S. PATENT DOCUMENTS

| | | |
|---|---|---|
| 2005/0097595 A1 | 5/2005 | Lipsanen et al. |
| 2005/0155078 A1 | 7/2005 | Imada et al. |
| 2005/0183120 A1* | 8/2005 | Jain .................... H04N 7/17336 725/46 |
| 2005/0216949 A1 | 9/2005 | Candelora et al. |
| 2005/0220139 A1 | 10/2005 | Aholainen |
| 2005/0226170 A1 | 10/2005 | Relan et al. |
| 2005/0240959 A1 | 10/2005 | Kuhn et al. |
| 2005/0249139 A1 | 11/2005 | Nesbit |
| 2005/0273791 A1 | 12/2005 | Evans et al. |
| 2006/0072553 A1 | 4/2006 | Miyajima et al. |
| 2006/0080717 A1 | 4/2006 | Barzilay et al. |
| 2006/0098596 A1 | 5/2006 | Park et al. |
| 2006/0107281 A1 | 5/2006 | Dunton |
| 2006/0117371 A1 | 6/2006 | Margulis |
| 2006/0123058 A1* | 6/2006 | Mercer ................ G11B 19/025 |
| 2006/0153166 A1 | 7/2006 | Kobayashi et al. |
| 2006/0156353 A1 | 7/2006 | Dorner |
| 2006/0156415 A1 | 7/2006 | Rubinstein et al. |
| 2006/0168319 A1 | 7/2006 | Trossen |
| 2006/0215593 A1 | 9/2006 | Wang et al. |
| 2006/0215648 A1 | 9/2006 | Jen |
| 2006/0235883 A1 | 10/2006 | Krebs |
| 2006/0258289 A1 | 11/2006 | Dua |
| 2006/0294559 A1 | 12/2006 | Ansari et al. |
| 2006/0294564 A1 | 12/2006 | Guillorit |
| 2007/0011182 A1 | 1/2007 | Chiu |
| 2007/0022055 A1 | 1/2007 | Eliason et al. |
| 2007/0025702 A1 | 2/2007 | Khan et al. |
| 2007/0043829 A1* | 2/2007 | Dua .................... H04L 29/1216 709/219 |
| 2007/0050818 A1 | 3/2007 | Berger et al. |
| 2007/0079010 A1 | 4/2007 | Heredia et al. |
| 2007/0107019 A1 | 5/2007 | Romano et al. |
| 2007/0124792 A1 | 5/2007 | Bennett et al. |
| 2007/0143831 A1 | 6/2007 | Pearson et al. |
| 2007/0165613 A1 | 7/2007 | Soo et al. |
| 2007/0168534 A1 | 7/2007 | Hiltunen et al. |
| 2007/0192782 A1 | 8/2007 | Ramaswamy |
| 2007/0225828 A1 | 9/2007 | Huang |
| 2007/0274672 A1 | 11/2007 | Itoi |
| 2008/0123568 A1 | 5/2008 | Rofougaran |
| 2008/0141324 A1 | 6/2008 | Keum et al. |
| 2008/0216138 A1 | 9/2008 | Minnick |
| 2009/0010247 A1 | 1/2009 | Stille |
| 2009/0010617 A1 | 1/2009 | Jones |
| 2009/0059090 A1* | 3/2009 | Fan .................... G07C 9/00031 348/734 |
| 2011/0107374 A1* | 5/2011 | Roberts .............. H04N 5/44543 725/46 |
| 2011/0258665 A1* | 10/2011 | Fahrny ............... H04N 21/4334 725/47 |
| 2014/0115330 A1 | 4/2014 | Chen |
| 2014/0148169 A1 | 5/2014 | Li et al. |
| 2014/0162558 A1* | 6/2014 | Dua .................. G06F 17/30058 455/41.2 |
| 2015/0113623 A1* | 4/2015 | Dua .................. H04L 29/06027 726/7 |

OTHER PUBLICATIONS

Faltstrom, P., "RFC 2916: E.164 number and DNS", The Internet Society, Sep. 2000.

* cited by examiner

METHOD, APPARATUS, AND SYSTEM FOR STREAMING DATA WITH BIOMETRIC VERIFICATION

CROSS-REFERENCE TO RELATED APPLICATIONS

The present invention is a continuation of and claims benefit of priority to co-pending U.S. patent application Ser. No. 13/947,367, filed Jul. 22, 2013, which is a continuation of and claims benefit of priority to U.S. patent application Ser. No. 12/623,422, filed on Nov. 22, 2009, and issued as U.S. Pat. No. 8,572,257 on Oct. 29, 2013, which is a continuation of and claims benefit of priority to U.S. patent application Ser. No. 11/341,715, filed on Jan. 27, 2006, and issued as U.S. Pat. No. 7,624,417 on Nov. 24, 2009, the entire disclosure of which is hereby incorporated by reference herein.

BACKGROUND OF THE INVENTION

Embodiments of the present invention relate generally to systems and methodologies for streaming data via a data network, such as the Internet, and more particularly to streaming data over a data network based on biometric verification.

A digital video recorder (DVR) is a device that records video to a digital storage medium such as a hard disk, DVD, or CD. The term DVR may be used to describe a device such as a Personal Video Recorder (PVR) or a closed circuit television (CCTV) DVR. It may also be used to reference a function in a device such as a digital video camera that has a DVR function built into it.

Television (TV) and video are terms that are sometimes used interchangeably, but in their narrow definitions are different. Video is the visual portion of television whereas television is video and audio modulated onto (combined with) a carrier frequency (television channel), so that it may be transported either wirelessly or over cables with many other frequencies (channels).

Consumer DVRs such as those offered by TiVo™ and ReplayTV™ provide a multimedia time warping system that gives users the ability to simultaneously record and play back TV broadcast programs. Such DVRs also allow consumers to pause, rewind, and play live TV in slow motion. DVR functionality is described in, for example, U.S. Pat. No. 6,233,389 assigned to TiVo, Inc. There are a number of technology trends in force today that are continuing to expand the functionality of DVRs.

For example, one such trend is the ability to record data onto a recordable DVD or CD. A digital video recorder system with an integrated DVD recording device that gives users the ability to record TV broadcast programs to a DVD and playback that content is specified in U.S. patent application Ser. No. 10/418,646 filed on Apr. 18, 2003.

Another trend is the ability to access media assets stored in a digital video recorder via the Internet. A method and system for accessing stored media assets in a digital recorder via the Internet using E.164 telephone numbers, Uniform Resource Identifiers (URIs), and other address schemes is specified in co-pending U.S. patent application Ser. No. 11/205,639 filed by the Applicant.

Consumers generally personalize their home television and radio programming to their own preferences. First, consumers generally choose providers that offer programming that matches their interests. In addition, consumers sometimes have the option of choosing specific content packages that meet their needs. For example, cable and satellite TV providers offer consumers a choice of packages, which include different channels and access to premium programming (e.g., sports broadcasts, movies, international content, etc.). However, as a general matter, to applicant's knowledge, there exists no system whereby consumers can easily and remotely access all their personalized, home-based television and radio programming on any Internet-enabled media device.

Two technology trends make the access of live media such as television and radio programming via the Internet feasible. First, the proliferation of broadband network access allows for the streaming of high-quality digital media across the Internet. Second, the proliferation of media devices that are able to connect to the Internet and process a variety of digital content makes this possible. Media devices include for example, cellular phones, personal digital assistants (PDAs), video players, music players, game players, digital video recorders (DVRs), network televisions, personal computers, etc. The miniaturization of such devices along with the ability to connect to wireless and wireline networks gives consumers the ability to access their home-based television and radio programming from virtually anywhere in accordance with the present invention.

As a result of the increasing availability of broadband Internet access, telecommunications providers are offering Internet Protocol (IP)-based voice and video services. Many service provider networks utilize the Session Initiation Protocol (SIP) to enable VOIP and other multimedia services. A SIP-compliant analog telephone adaptor (ATA) is generally deployed on residential and business broadband networks to facilitate the origination and termination of voice over Internet Protocol (VOIP) calls.

It would be advantageous to provide a digital media recorder system that is capable of simultaneously receiving multiple signal inputs, processing these signals, storing digital programming content, and making stored and live programming content available locally through a media device connected to the unit or remotely via the Internet. It would also be desirable for this system to be capable of receiving and processing multiple signal inputs from such sources as satellite television receivers, cable television receivers, CCTV networks, TV antennas (e.g., UHF and VHF), radio receivers (e.g., AM, FM, Shortwave, Long-wave, HD, weatherband, and Digital Audio Broadcasting), satellite radio receivers (e.g., Digital Audio Radio Services), video cameras, Internet, etc.

It would be another advantage to provide a digital media recorder that provides multimedia time warping functionality that can be controlled locally while in proximity to the digital recorder or remotely while accessing live media content over a data network such as a local area network (LAN), wide area network (WAN), or the Internet.

It would be a further advantage to provide a digital media recorder device with an integrated ATA that allows for call termination/origination. Having a single set-top box that provides VOIP and DVR functionality would simplify residential networks, as fewer devices would need to be configured and installed. It would be a further advantage to provide a set-top box that allows voice mail and video mail to be accessed via a television or remotely through any Internet-connected media device.

It would be a further advantage to provide remote access to the digital media recorder device via the Internet using a unified address scheme such as the E.164 numbering system or system of URIs that would also be used to terminate and originate VOIP calls to/from the device.

It would be a further advantage to provide a digital media recorder device with an integrated radio frequency identification (RFID) module for facilitating secure electronic payment via the Internet, user authentication, the rapid setup of wireless communication with electronic devices, and other applications.

SUMMARY OF THE INVENTION

According to an embodiment of the invention, a computing device includes a wireless transceiver configured to communicate wirelessly with a data network, a user interface configured to receive a user input to stream data between a streaming device and the computing device in communication with the data network, and a biometric characteristic reader configured to receive user characteristic data to verify a user's identity. The computing device is configured to stream the data between the streaming device and the computing device via the wireless transceiver and the data network based on verification of the user's identity.

According to another embodiment, a computing system includes a streaming device in communication with a data network, and a computing device. The computing device includes a wireless transceiver configured to communicate wirelessly with a data network, a user interface configured to receive a user input to stream data between the streaming device and the computing device, and a biometric characteristic reader configured to receive user characteristic data to verify a user's identity. The computing device is configured to stream the data between the streaming device and the computing device via the wireless transceiver and the data network based on verification of the user's identity.

According to yet another embodiment of the invention, a method includes receiving a user input at a user interface of a computing device to stream data between the computing device and a streaming device in communication with a data network, the computing device being in wireless communication with the streaming device via the data network. The method includes receiving, by a biometric characteristic reader, a biometric characteristic of a user, and verifying an identity of the user based on the biometric characteristic of the user. The method further includes wirelessly streaming the data between the streaming device and the computing device via a wireless transceiver of the computing device based on the verifying the identity of the user.

These and other advantages and features of the present invention are described herein with specificity so as to make the present invention understandable to one of ordinary skill in the art. Other aspects and advantages of the invention will become apparent from the following detailed description in combination with the accompanying drawings, illustrating by way of example, the principles of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Embodiments of the present invention related to systems and methodologies for accessing media content via the Internet are now described in specific terms sufficient to teach one of skill in the practice the invention herein. In the description that follows, numerous specific details are set forth by way of example for the purposes of explanation and in furtherance of teaching one of skill in the art to practice the invention. It will, however, be understood that the invention is not limited to the specific embodiments disclosed and discussed herein and that the invention can be practiced without such specific details and/or substitutes therefor. The present invention is limited only by the appended claims and may include various other embodiments which are not particularly described herein but which remain within the scope and spirit of the present invention.

A general discussion of embodiments of the present invention is now provided and is thereafter followed by a detailed description of each of the components and functions of the invention according to specific preferred embodiments.

An embodiment of the invention includes, as primary component, a network-enabled set-top box with an integrated hard drive (for digital media recording, playback, and time warping). Embodiments of the invention may also include other components such as a high-speed DVD/CD recorder (for digital media recording and playback), an analog telephone adapter (for the termination and origination of VOIP calls), a transceiver/tuner (for receiving and transmitting a plurality of wireless and wireline signal types), and a radio frequency identification (RFID) module (for facilitating electronic payments via the Internet, user authentication, the rapid setup of wireless communication with electronic devices, and other applications). The set-top box integrates a variety of wireless and wireline interfaces, expansion slots, and audio/video input and output connectors. The set-top box is capable of receiving, processing, storing, and transmitting a variety of media types including television, audio, video, images, presentations, animation, and Internet content.

Figure 1:
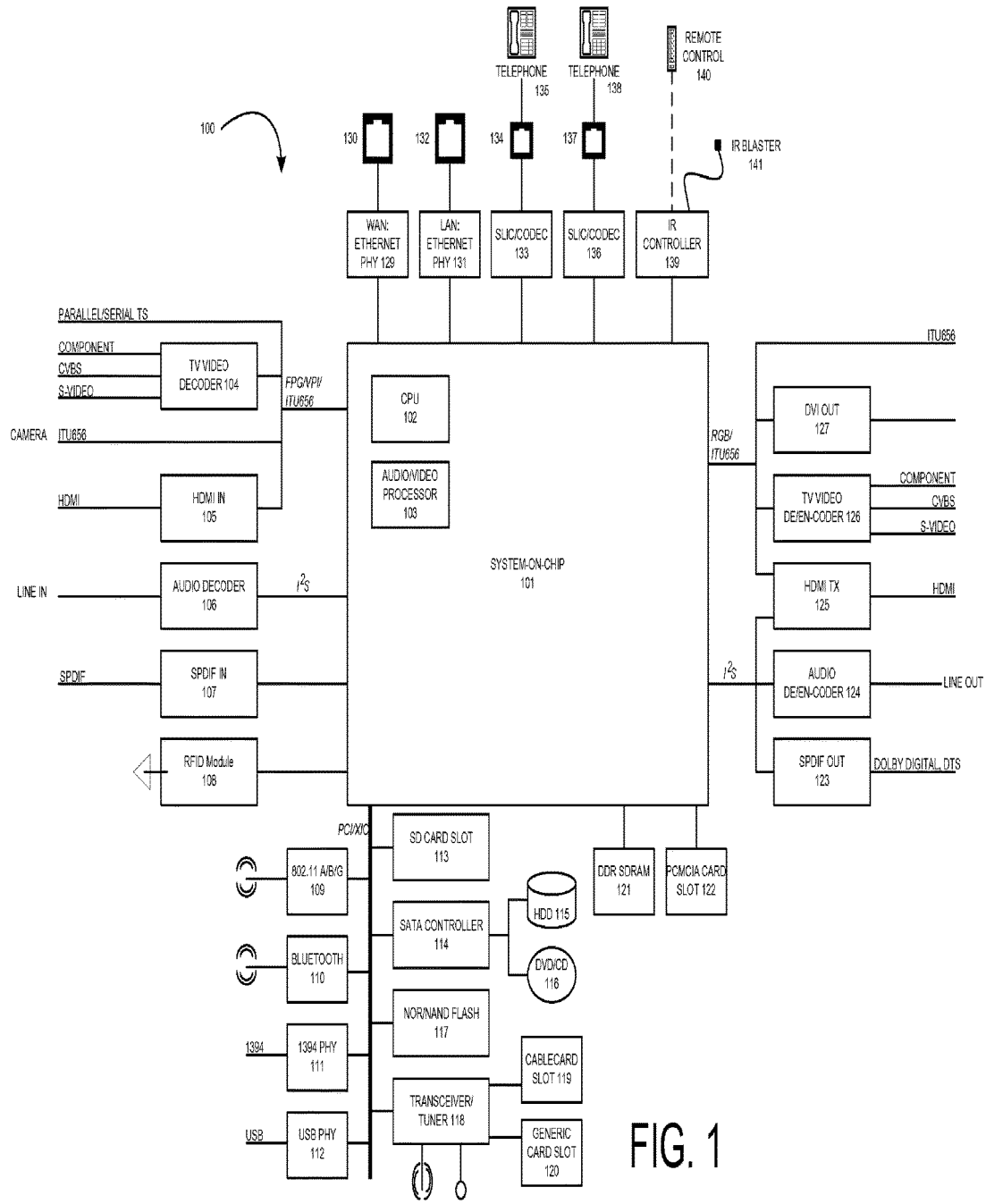
FIG. 1 is a reference diagram of the architecture of the set-top box components of the present invention, in accordance with one embodiment thereof.

FIG. 1 is a reference diagram of the architecture of the set-top box 100, in accordance with one embodiment of the present invention. The set-top box 100 includes a casing that encloses various internal electrical components (including integrated circuit chips and other circuitry) that provide computing operations for the set-top box 100. In addition, the casing may also define the exterior shape, form, and color of the set-top box.

The core of the set-top box 100 is a system-on-chip media processor 101 containing a CPU 102 with multiple cores. In another embodiment, the system-on-chip 101 may contain multiple CPUs in a series of symmetrical processing subsystems. The CPU 102 is configured to execute instructions and to carry out various operations. In most instances, the CPU 102 executes instructions under the control of the unit's operating system or installed software. The CPU 102 runs a real-time operating system enabling efficient and predictable response to real-time events.

The set-top box 100 preferably integrates NOR/NAND Flash Memory 117 and a SD Card Slot 113 which interface with the system-on-chip 101 and CPU 102 via a PCI/XIO interface. The SD Card Slot 113 allows for the insertion of a SD (Secure Digital) Memory Card commonly used for storing digital content in cameras, cell phones, music players, and other electronic devices. Users can insert a SD Memory Card into the SD Card Slot 113, and view/listen to digitally encoded videos, photos, music, or other media content through a media device directly connected to the set-top box 100 or accessible to it over a network.

The set-top box 100 preferably utilizes fast DDR SDRAM 121. The DDR SDRAM 121 and Flash Memory module 117 support the storage of the set-top box's BIOS and operating system (OS) during operation of the unit 100. Other memory technologies and allocations of data to such classes of memory may alternatively be used while still remaining within the scope of the present invention.

The set-top box 100 is capable of receiving and processing multiple signal inputs from sources such as satellite television receivers, cable television receivers, CCTV networks, UHFNHF TV antennas, AM/FM/Shortwave/Longwave/HD/weatherband/DAB radio receivers, satellite radio receivers (e.g., XM™ and Sirius™), video cameras, Internet, etc. The set-top box 100 supports a plurality of video input/output standards including parallel/serial TS, component, CVBS, S-Video (Super-Video), ITU656, and HDMI (High-Definition Multimedia Interface). The set-top box 100 supports a plurality of audio input/output standards including SPDIF (Sony/Philips Digital Interface) for transmission of digital audio in formats such as Dolby Digital, DTS, AC3, etc. Input and output connectors for analog audio are also included. The set-top box may provide for multiple connectors of each type. Embodiments of the invention could also support other current and future audio and video input/output standards without being outside the spirit and scope of the present invention.

The set-top box 100 supports National Television Standards Committee (NTSC), Systeme Electronique pour Couleur avec Mémoire (SECAM), Phase Alternating Line (PAL), and digital standards such as Digital Satellite System (DSS), Digital Broadcast Services (DBS), and Advanced Television Standards Committee (ATSC). The set-top box 100 may support other current and future television input standards without being outside the spirit and scope of the present invention.

Analog video signals enter the unit via component, CVBS, or S-Video inputs and are decoded by the NTSC/PAL/SECAM TV Video Decoder Module 104. Input audio streams are simultaneously decoded by the Audio Decoder Module 106 or the SPDIF (Sony/Philips Digital Interconnect Format) input 107. The decoded video and audio streams are encoded to MPEG by an on-board audio/video processor 103. The MPEG stream is directed to the hard disk 115 via a PCI/XIO interface, and simultaneously passed to the TV Video Decoder/Encoder 126 or DVI (Digital Visual Interface) OUT 127, and Audio Decoder/Encoder 124 or SPDIF OUT 123 for output to a television that is connected to the set-top box 100 via an audio line and component, CVBS, or S-Video outputs for live viewing if desired. The TV Video Decoder/Encoder 126 performs MPEG decoding and NTSC/PAL/SECAM encoding. When the hard disk 115 is selected for output, program material flows from the hard disk 115 through the PCI/XIO interface to the Audio/Video Processor 103 and on to the TV Video Decoder/Encoder 126 or the DVI OUT 127, and Audio Decoder/Encoder 124 or the SPDIF OUT 123 for output to a television.

The set-top box 100 accepts digital video input via universal parallel/serial interface, ITU656, or HDMI. The unit has corresponding digital outputs. An HDMI input controller 105 supports the processing of uncompressed digital audio and video between the source and the system-on-chip media processor 101. An HDMI output controller 125 similarly controls the processing of digital audio and video transmitted from the system-on-chip media processor 101 for output to a media device (e.g., HD TV) connected to the set-top box 100.

The set-top box 100 may include a remote control 140 or wireless keyboard which allows a user to control the set-top box 100 from a distance via infrared (IR). As an example, when a button is pressed on the remote control 140, the remote's LED sends a special code assigned to that key as a beam of infrared light pulses. An infrared (IR) controller 139 functions as a receiver for infrared signals and converts the signals to electrical impulses which can be used by the CPU 102 to initiate specific commands or operations within the set-top box.

An infrared (IR) control cable and emitter (sometimes referred to as an "IR blaster") 141 may also attach to the infrared controller 139, allowing the set-top box 100 to send signals to a cable receiver, satellite receiver, or other electronic device with an integrated IR receiver. As an example, infrared signals emitted by the IR blaster 141 can allow the set-top box 100 to change channels on the receiver/tuner to which its IR blaster 141 is attached. The remote control unit 140 may alternatively communicate with the set-top box 100 using Bluetooth or another wireless standard.

The set-top box 100 also has an integrated multi-purpose transceiver and digital tuner unit 118 that eliminates the need for separate set-top boxes for processing broadcast signals such as satellite television, cable television, satellite radio, terrestrial radio, etc. The transceiver/tuner unit 118 allows a cable/satellite line to be directly connected to the set-top box 100. The transceiver/tuner unit 118 and its integrated RF antenna allow for the reception and local broadcast of television and radio signals. The transceiver/tuner and antenna support UHF/VHF television signaling and AM, FM, Shortwave, Longwave, HD, weatherband, and DAB radio signaling. The transceiver/tuner unit 118 also supports satellite-based Digital Audio Radio Services (DARS) allowing the set-top box 100 to receive programming in the "S" band (2.3 GHz) spectrum used by companies such as XM and Sirius.

A CableCARD™ slot 119 is integrated in the set-top box 100 and interfaces directly with the transceiver/tuner unit 118. The CableCARD slot 119 allows for a PCMCIA Type II form factor card to be inserted which decrypts input media streams and enables digital video programming and other services. The insertion of a functional CableCARD in the slot 119 eliminates the need for a separate receiver unit from a cable provider, and allows for the direct connection of a cable line to the set-top box 100. The CableCARD specification was established by Cable Television Laboratories, Inc. (CableLabs®).

A generic card slot 120 is also represented in FIG. 1 which can be used to provide similar decryption, decoding, subscriber management, and network features for satellite television, satellite radio, or other broadcast sources, thereby eliminating the need for even further receiver devices.

The set-top box 100 also allows for wireline and wireless interface to LANs and external devices connected there through. Various TCP/IP-capable network protocols, such as wired Ethernet, wireless 802.11 a/b/g, powerline, or other physical layers can be supported. The set-top box 100 has an integrated 802.11 a/b/g controller 109 and Bluetooth controller 110 for wireless connectivity. The set-top box 100 also has a 1394 controller 111 and a high-speed Universal Serial Bus (USB) controller 112 for wireline connectivity with external devices. These wireless and wireline controllers communicate with the system-on-chip processor 101 via a PCI/XIO interface. The set-top box additionally integrates a 10/100/1000 Mbps Ethernet controller 129 and autosensing RJ-45 port 130 for wide area network (WAN) connectivity to a service provider network. Also included is a 10/100/1000 Mbps Ethernet controller 131 and autosensing RJ-45 port 132 for local area network (LAN) connectivity. Additional wireless and wireline interface standards may be supported by the set-top box 100 while remaining within the spirit and scope of the present invention. The set-top box 100 may employ any of these wireless and wireline interfaces to receive or transmit television, audio, video, and other data.

In addition to the above, the set-top box 100 allows for the origination and termination of VOIP calls using standard analog telephones. The set-top box allows for the connection of an analog telephone 135 or other analog telephony device to an integrated RJ-11 port 134. A single low-voltage CMOS integrated circuit 133 provides the interface between the RJ-11 port 134 and the system-on-chip media processor 101. The CMOS integrated circuit 133 integrates a subscriber line interface circuit (SLIC), codec and battery generation functionality. Software configurable features of the unit 133 include 5 REN internal ringing up to 90 VPK, DTMF generation and decoding, and a comprehensive set of telephony signaling capabilities for global operation with only one hardware solution. The CMOS integrated circuit 133 continuously adapts battery output voltage to minimize power for all operating modes and line conditions.

The set-top box embodied in FIG. 1 features a second RJ-11 port 137 which allows an additional analog telephone 138 or other device to be connected to the unit 100. An additional low-voltage CMOS integrated circuit 136 with SLIC, codec and battery generation functionality provides the interface between the RJ-11 port 137 and system-on-chip media processor 101.

Each RJ-11 port could be associated with separate E.164 telephone numbers. An alternate embodiment of the set-top box 100 may provide for more RJ-11 ports, allowing additional analog telephones, fax machines, or other devices to be connected and used for communication via an Internet Protocol network.

A universal PCMCIA card slot 122 provides support for future expansion applications. The slot allows for the insertion of a PCMCIA card, which may provide the unit with added capabilities.

The set-top box 100 supports the Universal Plug and Play (UPnP™) standards, adheres to the Intel Networked Media Product Requirements (NMPR) specifications, and is designed to DLNA guidelines.

One alternate technology similar to UPnP™ that could also be supported is Bonjour (formerly known as Rendezvous). Bonjour, developed by Apple Computer, Inc. (Cupertino, Calif.), enables automatic discovery of computers, devices, and services on IP networks. Bonjour uses industry standard IP protocols to allow devices to automatically find each other without the need to enter IP addresses or configure DNS servers. Bonjour is an "open" protocol that Apple has submitted to the IETF as part of the ongoing standards-creation process. Other standards that may also be supported include JINI from Sun Microsystems, Inc. and IETF's Zeroconf.

The operating system supports the core functionality of the digital set-top box 100 such as the ability to simultaneously process multiple signal inputs, store media on a DVD and playback that media, digital media recording and playback using the integrated hard disk, media time warping capabilities, voice and video over IP functionality, the ability to control the simultaneous output of multiple processed media streams to attached devices and network connected devices, and various RFID applications (virtual connector, electronic payment, authentication, etc.).

The operating system additionally allows the set-top box to function as a digital answering machine that allows for customized voice mail and video mail greetings. When calls are unanswered by the user, voice mail and video mail messages can be digitally stored on the hard disk 115 integrated in the set-top box 100. A user can be alerted to stored messages with a flashing light emitting diode (LED) on the front panel of the set-top box 100, a beeping tone emitted by the set-top box 100, and/or a unique dial-tone heard when a telephone connected to the set-top box 100 is engaged. The user may also be alerted to waiting messages when a television connected to the set-top box 100 is turned on. A message notifying the user of the waiting messages will overlay the programming being viewed. A single button on the set-top box's remote control allows the user to listen to or view voice mail and video mail via a connected television unit.

The operating system allows the establishment of user profiles in the system with a variety of possible user authentication modes (e.g., usernames, passwords, PINs, biometrics, RFID, etc.). Users can securely access their profile in the system using the access methods described to set individual recording schedules, access stored media assets, access personal preferences, and other functions. These access methods are designed to be used while in proximity to the set-top box or remotely via a data network such as the Internet. The set-top box may come with multiple RFID tags which can be registered by the device and associated with user profiles. Alternatively, the set-top box may allow for the registration of RFID tags contained within other types of devices that a user may carry (e.g., cellular phones, PDAs, music players, credit cards, identification cards, etc.) which could also provide user's with access to their profile within the system. The operating system further provides parental control features allowing, for example, certain media programming to be restricted for specified users.

The operating system additionally provides functionality such as video-on-demand, e-mail access, web access, instant messaging/chat, Internet downloads, and other features offered by media devices such as the MSN TV 2 Internet & Media Player. The operating system incorporates various digital rights management (DRM) technologies and standards. The set-top box 100 can perform other functions through application software which can be downloaded via the Internet, installed, and run on the unit.

The operating system supports a plurality of video, audio, and image standards such as MPEG-1, MPEG-2, MPEG-3, MPEG-4 (SP, ASP), MPEG-7, MPEG-21, DV, DivX-3/4/5, AVC/H.264, WMV9, H.323, Dolby Pro Logic, Dolby Digital (AC-3), MP2, MP3, L2, AAC, WMA9, JPEG, GIF, BMP, and PNG. The set-top box 100 is capable of performing encoding and decoding between many of these standards using the integrated audio/video processor 103.

Integrated in the system-on-chip 101 is a dedicated audio/video processor 103 with multiple cores. The audio/video processor 103 provides video capabilities such as acceleration, compression, picture enhancement, motion-adaptive de-interlacing, high-definition video scaling, linear and non-linear aspect-ratio conversion, anti-flicker filtering, brightness control, pixel shading, synchronization, encoding, decoding, and other advanced features. The audio/video processor 103 provides audio capabilities such as compression, echo and noise cancellation (e.g., for VOIP communication), 3D/2D audio acceleration, synthesis, filters, chorus, reverb, exciter, compressor/limiter, equalization, synchronization, encoding, decoding, and other advanced functionality.

The audio/video processor 103 is capable of simultaneously processing multiple analog and digital media streams. Media streams processed by the audio/video processor 103 can be directed to the hard disk 115 for storage, written to a DVD/CD, written to a SD card, output to one or more media devices connected to the set-top box 100 (e.g., television), or transmitted to other electronic devices via a data network such as a LAN, WAN, or the Internet.

In one embodiment, the integrated hard disk unit 115 and DVD/CD recorder unit 116 interface with a SATA controller 114 which bi-directionally communicates with the system-on-chip 101 via a PCI/XIO interface. The hard disk unit 115 could use any number of disk storage technologies capable of holding encoded information including optical, magnetic, holographic, etc. Other types of storage solutions could be used in lieu of a hard disk 115 while remaining within the scope and spirit of the present invention. The hard disk 115 stores software and recorded program material.

The set-top box's DVD unit 116 preferably supports HD-DVD, Blu-Ray, or other standards that provide large storage capacity and deliver high-definition experiences.

Program information can also flow between (to and from) the hard disk 115 and the DVD/CD player/recorder 116. Data can be transferred from the DVD/CD player/recorder via the PCI/XIO interface to the audio/video processor 103. The data are passed through the audio/video processor to the hard disk 115 via the PCI/XIO interface. The pass through can occur for data in both directions (DVD/CD player/recorder 116 to hard disk 115 and hard disk 115 to DVD/CD player/recorder 116).

When the DVD/CD player/recorder 116 is used for playback of program material, the program material flows through the audio/video processor 103 to one of the output modules (e.g., HDMI TX controller 125) and out to a viewer/player device. Alternatively, program material could flow through the audio/video processor 103 to the hard disk 115 before being sent to one of the output modules.

The application software stored on the hard disk 115 allows the CPU 102 to display the contents of program material stored on the hard disk, SD card, and a DVD/CD inserted into the DVD/CD player/recorder 116 to the user. The user is also provided full control of program material transferred between the hard disk 115, SD card, and the DVD/CD player/recorder 116 through the application software.

The operating system of the set-top box preferably supports TCP, UDP, ICMP, RARP, ARP, DNS, DHCP, NTP, SNTP, STUN, HTTP, and TFTP. Other protocols could also be supported. The operating system supports IPv4 and IPv6 network addressing.

The operating system supports voice signaling protocols (SIP, MGCP, H.323, SDP, RTP, RTCP, RFC 2833 X-NSE Tone Events for SIP/RTP, and RFC 2833 AVT Tone Events for SIP/RTP), packetizing (RTP, Jitter Buffer), voice processing (echo cancellation, voice compression, DTMF, etc.) and reference hardware-specific drivers (for audio and/or telephony devices). The operating system additionally supports fax communication and supports G.711 Fax Pass-Through, T.38-Real-Time Fax Over IP, T.38 using UDP, and T.38 using RTP.

In a preferred embodiment of the present invention, set-top box 100 utilizes SIP for call signaling and supports numerous SIP extensions and methods. Set-top box 100 supports essential routing features—including Routing with Network Address Port Translation (NAPT) and support for Virtual Private Network pass-through. The set-top box 100 also offers STUN (Simple Traversal of UDP Through NAT), TURN (Traversal Using Relay NAT), RSIP (Realm Specific IP) and outbound proxy support for NAT traversal. Other NAT traversal techniques may also be supported by the unit as various new standards and technologies develop and are deployed. One such technique includes the Interactive Connectivity Establishment (ICE), developed by the IETF's MMUSIC working group. ICE provides a framework to unify the various NAT traversal techniques. This enables SIP-based VOIP clients to successfully traverse the variety of firewalls that may exist between a remote user and a network.

The set-top box 100 also prioritizes telephone calls over Internet traffic so users obtain clearer voice quality comparable to analog voice service over a circuit-switched network. Set-top box 100 may also offer rich CLASS features for enhanced telephony services such as call waiting, three way calling, caller ID, etc. With respect to caller ID, the set-top box 100 is capable of overlaying caller ID data with television programming for display on a TV.

Currently VOIP service providers must maintain an interface to the circuit-switched PSTN in order to route calls to and from other carriers. As all circuit-switched traffic is likely to migrate to packet networks such as the Internet in the future, the need to maintain a PSTN interface will likely be eliminated. In the future, Electronic Numbering (ENUM) is planned for use to resolve a fully qualified E.164 telephone number for a particular wireline or wireless device to a fully qualified domain name address using a DNS-based architecture. ENUM (RFC 3761) is the Internet Engineering Task Force (IETF) standard that defines a mechanism for using the Domain Name Service (DNS) as a tool to "discover" services associated with a telephone number (E.164 number).

In accordance with the invention, the operating system of the set-top box 100 incorporates an ENUM engine and a built-in DNS resolver. The ENUM engine is a standard compliant resolution tool developed based on IETF's RFC 3761. The ENUM engine provides the DNS message processing and network transport mechanisms required to translate a telephone number into a set of ENUM records. The ENUM engine supports DNSSEC and TSIG to address a variety of security issues. The ENUM engine automatically processes NAPTR record(s) in DNS wire format into application service, order, preference, and URI fields. Additionally, the ENUM engine correctly parses the NAPTR service fields and dynamically interprets POSIX Extended Regular Expressions. The ENUM engine is capable of filtering the results based on application protocol and/or service type.

As an enabler for VOIP communication, the set-top box 100 may have one or more E.164 phone numbers associated with it. The E.164 numbers can in turn be associated with one or more ENUM-based services that are enabled by functionality of the set-top box 100. The set-top box 100 could also have Uniform Resource Identifiers (URIs) or other types of addresses that can be resolved over the Internet associated with it.

The set-top box 100 of the present invention may also include integrated Radio Frequency Identification (RFID) technology. More specifically, the set-top box 100 may include an RFID Module 108 that is capable of functioning as both an RFID tag and an RFID reader. In accordance with the invention, the RFID Module 108 interfaces with the unit's system-on-chip 101. The RFID Module 108 comprises a radio frequency ID transponder which conforms to the principals of RFID technology and known standards. The RFID Module 108 also includes a reader component used for transmitting interrogation signals via its antenna to an external electronic device's RFID tag when in close proximity, and receiving a response signal from the external device's RFID tag. The RFID Module 108 uses the set-top box's 100 internal power supply as a power source for transmitting interrogation signals to a target device.

According to a preferred embodiment, the RFID Module 108 allows interoperability with all RF 13.56 MHz readers and tags compatible with existing international standards, including ISO 14443 NB, ISO 15693, Sony FeliCa™, and Near Field Communication (NFC). NFC technology can be used as a virtual connector system for quickly and securely establishing wireless connectivity between the set-top box and other electronic devices. Near Field Communication (NFC) technology—jointly developed and promoted by Philips and Sony—evolved from a combination of contactless identification and interconnection technologies. Underlying layers of NFC technology are standardized in ISO (18092 and 21481), ECMA (340 and 352), and ETSI TS 102 190. Other RFID standards could be supported by the RFID Module 108 while remaining within the scope and spirit of the invention.

The RFID Module 108 is provided so that, among other things, the set-top box 100 can rapidly exchange information with an electronic device that is in close proximity and which also has integrated RFID technology. Information exchanged between the set-top box 100 and a target device via RFID can allow for the fast, automatic, and secure set-up of Wi-Fi, Bluetooth, and other wireless connections in accordance with the NFC specifications. These specifications allow RFID technology to be employed as a virtual connector system between devices.

In accordance with the invention, the set-top box 100 also integrates teachings and methods outlined in U.S. patent application Ser. No. 11/127,979 filed by the applicant of this invention and incorporated herein by reference. Those teachings and methods specify among other things, techniques for capturing the media processing capability and other parameters of a target device via RFID, using RFID to quickly establish a wireless connection with a target device and automatically transmitting certain media assets to it once connectivity has been established, and the establishment and use of profiles for target devices that have previously exchanged communication settings and parameters via RFID. Such functionality could be used, for example, to allow a media player with an integrated RFID module to quickly establish a communication link with the set-top box 100 and automatically transmit certain media assets to it once connectivity has been established. The method includes, in one embodiment, automatically transmitting media that is being viewed/played on the media player at the time of an RFID exchange with the set-top box 100, its remote control 140, or keyboard. The received media content would be automatically processed by the set-top box 100 and output to a media device (e.g., TV, stereo, etc.) connected to the set-top box. The user can in turn use the controls (e.g., "play", "pause", "fast forward", "rewind", "stop", "skip back", "skip forward", etc.) on the transmitting media player device, or software operating therein, to alter the viewing/listening experience of the media being output by the set-top box 100. Similarly, the RFID functionality could be used to automatically transmit programming that is being output by the set-top box 100 at the time of an RFID exchange with a media player.

In accordance with U.S. patent application Ser. No. 11/127,979 filed by the applicant, the registration of electronic devices via RFID and the establishment of profiles for the devices in the set-top box 100 can be used, for example, to securely register wireless VOIP handsets. The initial exchange of encryption data and other parameters via RFID allows the VOIP handsets to securely communicate with the set-top box 100 on an ongoing basis.

The RFID Tag-Reader Module 108 can also be used to register media devices (e.g., cellular phones, PDAs, etc.) that would be authorized to initiate connectivity with the set-top box 100 over a data network such as the Internet. According to the invention, the set-top box 100 and the registering media device may exchange encryption keys, security information, and other parameters via an RFID data exchange during registration. The registered media device and set-top box 100 may establish connectivity over a data network and authenticate one another and securely communicate using the information exchanged during the RFID registration process.

The RFID Tag-Reader Module 108 can also be used to facilitate electronic payments via a data network such as the Internet by capturing account data from cards (e.g., MasterCard Paypass™, American Express ExpressPay™, etc.), fobs, cellular phones, and other devices that have integrated RFID chips. The RFID Module 108 can also be used to facilitate user authentication over a data network by capturing identification data from devices with integrated RFID chips (e.g., loyalty cards, membership cards, ID cards, cellular phones, etc.) and transmitting it to a server. The RFID module may be used to authenticate users on the set-top box itself, allowing users to securely access their profile within the system. As mentioned previously, the set-top box may come with RFID tokens that can be assigned to individual users, or can allow for the registration of other RFID-based devices and linkage to user profiles within the system.

In an alternate embodiment of the invention, an RFID Tag-Reader Module is integrated in the set-top box's remote control 140 or key board unit instead. This embodiment provides for the same RFID functionality described earlier, but makes it accessible to the user from a distance. In this embodiment, data captured by the remote control or keyboard via RFID is securely transmitted to the set-top box 100 for processing. Alternatively or in addition, data captured by the remote control or keyboard can be used to customize the remote control based upon user preferences or otherwise with respect to the captured data.

In yet another embodiment, an RFID Tag-Reader Module is incorporated in both the set-top box 100 as well as its accompanying remote control 140 or keyboard. In either case, the RFID Tag-Reader Module is capable of reading an RFID tag and writing data to a tag that is presented.

Figure 2:
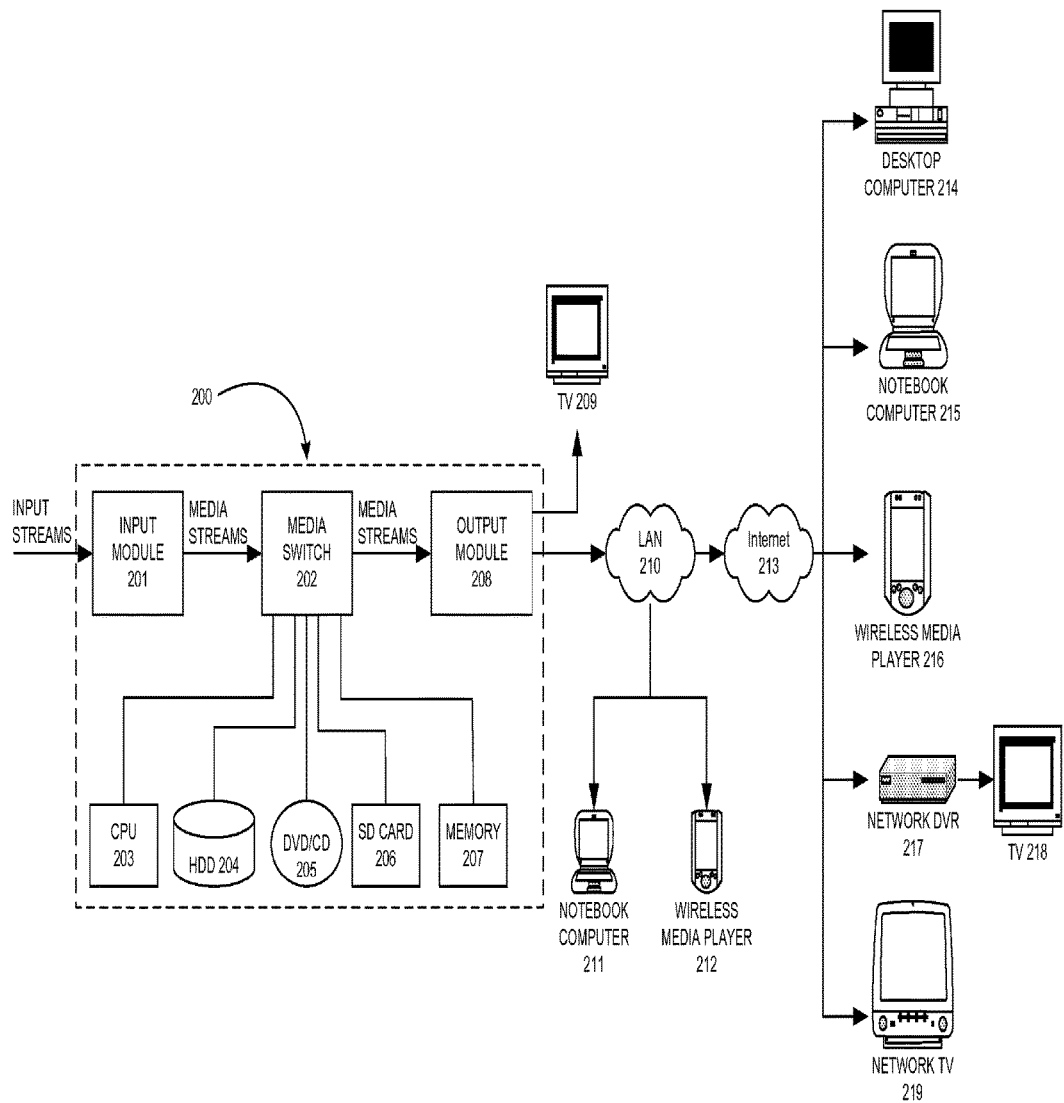
FIG. 2 is a block schematic diagram depicting key components of the set-top box involved in the processing of multiple input signals and the output of processed signals to a multiplicity of media devices.

FIG. 2 is a block schematic diagram depicting key components of the set-top box 200 involved in the processing of multiple input signals and the output of processed signals to a multiplicity of media devices. A preferred embodiment of the invention includes an Input Module 201, Media Switch 202, and Output Module 208. These modules are specifically highlighted in FIG. 2 in order to illustrate critical functions performed by the set-top box's hardware and software components. The Input Module 201 takes input streams from multiple sources such as satellite television receivers, cable television receivers, CCTV networks, TV antennas (e.g., UHF and VHF), radio receivers (e.g., AM, FM, Shortwave, Longwave, HD, weatherband, and Digital Audio Broadcasting), satellite radio receivers (e.g., Digital Audio Radio Services such as XM and Sirius), video cameras, Internet, etc. The Input Module 201 may receive signals via one or more transceiver/tuner units integrated in the set-top box 200. Input television, audio, video, or other media streams could be in varying formats. For example, the Input Module 201 is capable of receiving and processing television input streams in a multitude of forms, for example, NTSC, SECAM, PAL, DSS, DBS, or ATSC. DBS, DSS and ATSC are based on standards called Moving Pictures Expert Group 2 (MPEG2) and MPEG2 Transport. MPEG 2 Transport is a standard for formatting the digital data stream from the TV source transmitter so that a TV receiver can disassemble the input stream to find programs in the multiplexed signal. The Input Module 201 produces MPEG streams. An MPEG2 transport multiplex supports multiple programs in the same broadcast channel, with multiple video and audio feeds and private data. The Input Module 201 tunes the channel to a particular program, extracts a specific MPEG program out of it, encodes it to MPEG-4/H.264 AVC, and feeds it to the rest of the system. The Input Module is also capable of receiving and decoding high-definition media streams in MPEG-4/H.264 AVC format and feeding it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Close Caption (CC) and Extended Data Services (EDS). Such signals are decoded by the Input Module 201 and passed to other modules as if they were delivered via a private data channel.

The Input Module 201 handles the encoding of analog radio signals (e.g., AM, FM, etc.) also. Analog radio signals are encoded to a digital format such as Advanced Audio Coding (AAC), aacPlus v1 or aacPlus v2, and fed to the rest of the system. The Input Module 201 may receive digital radio input streams and pass them to the rest of the system in their native format, or also convert them to AAC, aacPlus v1 or aacPlus v2.

The Media Switch 202 explained herein represents functions performed by the operating system and system-on-chip processor. The Media Switch 202 mediates between a microprocessor CPU 203, hard disk or storage device 204, DVD/CD player/recorder 205, SD Card Slot 206, and memory 207. For example, television input streams are converted to a MPEG stream (as described earlier) and sent to the Media Switch 202. The Media Switch buffers the MPEG stream into memory. It then performs two operations if the user is watching TV through an attached display unit (e.g., HD TV) or remotely via the Internet on a media player device: the stream is sent to the Output Module 208 and it is written simultaneously to the hard disk 204 or other storage component. The stored media coupled with the set-top box's multimedia time warping feature allows a user to reverse, fast forward, play, pause, index, fast/slow reverse play, and fast/slow play live television. The Media Switch 202 is also capable of processing radio, audio, video, and other media streams in the same manner. In accordance with the invention, the multimedia time warping functionality is available for use with all types of media streams and can be controlled locally using the set-top box's remote control, or remotely through software/hardware controls made available on a media player device that is receiving media content from the set-top box 200 over a data network such as the Internet 213.

The Media Switch 202 allows a user to play/view program material stored on the hard disk 204, a DVD/CD inserted into the DVD/CD player/recorder 205, or a SD Card inserted into the unit's SD Card Slot 206. The user can transfer program material between the hard disk 204 and the DVD/CD player/recorder 205. The DVD/CD player/recorder 205 records program material stored on the hard disk 204 onto a recordable DVD/CD. The Media Switch 202 also transfers program material from the DVD/CD player/recorder 205 onto the hard disk 204. The Media Switch 202 further allows program material to be transferred between the hard disk 204 and a SD Card inserted in the SD Card Slot 206, and between a DVD/CD and a SD Card.

The Media Switch 202 is capable of writing a live media stream onto the hard disk 204, a recordable DVD/CD, and SD Card. The Media Switch 202 further allows multiple media streams to be written to the hard disk simultaneously while multiple media streams are extracted from it for output.

In the case of television programming, the Output Module 208 takes MPEG streams as input and produces an analog TV signal according to NTSC, SECAM, PAL, or other required TV standards. The Output Module 208 can also take MPEG streams as input and produce a digital signal that is compatible with the digital display unit (e.g., HD TV) on which the media is being viewed. The Output Module 208 contains an MPEG decoder, On-Screen Display (OSD) generator, analog TV encoder and audio logic. The OSD generator allows the program logic to supply images, which will be overlaid on top of the resulting analog TV signal. Additionally, the Output Section can modulate information supplied by the program logic onto the VBI of the output signal in a number of standard formats, including NABTS, CC and EDS.

The Output Module 208 is capable of receiving multiple media streams in different formats and simultaneously processing them for output to multiple media devices that are physically connected to the set-top box 200 (via cable), accessible via a local area network 210, or accessible through a wide area network such as the Internet 213. The Output Module 208 has the capacity to buffer multiple content streams being transmitted to media devices over a network. Referring to FIG. 2, the Output Module 208 is streaming television programming to a HD-enabled television 209 that is physically connected to the set-top box 200 via High-Definition Multimedia Interface (HDMI). The Output Module 208 is streaming yet another television program in MPEG-4/H.264 AVC format to a LAN connected notebook computer 211. The Output Module 208 is also streaming FM radio programming to a wireless media player 212 via the LAN 210. The Output Module 208 is additionally streaming XM radio programming to a desktop computer 214 via the Internet 213. Other Internet connected devices are shown in FIG. 2 to indicate that additional media streams could be simultaneously sent to other types of media player devices such as a desktop computer 214, notebook computer 215, wireless media player 216, network DVR 217 (with attached TV 218), and network TV 219. All external media player devices, whether physically connected to the set-top box 200, accessible to it via a LAN 210, or connected via the Internet 213 can access live media content processed by the set-top box 200 or content saved on the hard drive, a DVD/CD, SD Card, or other storage component. In accordance with the invention, the set-top box's time warping functionality for live content is simultaneously administrable locally or via a communications network such as the Internet 213 for each output media stream. Furthermore, the Output Module 208 is capable of simultaneously transmitting multiple media streams to the same media device.

Figure 3:
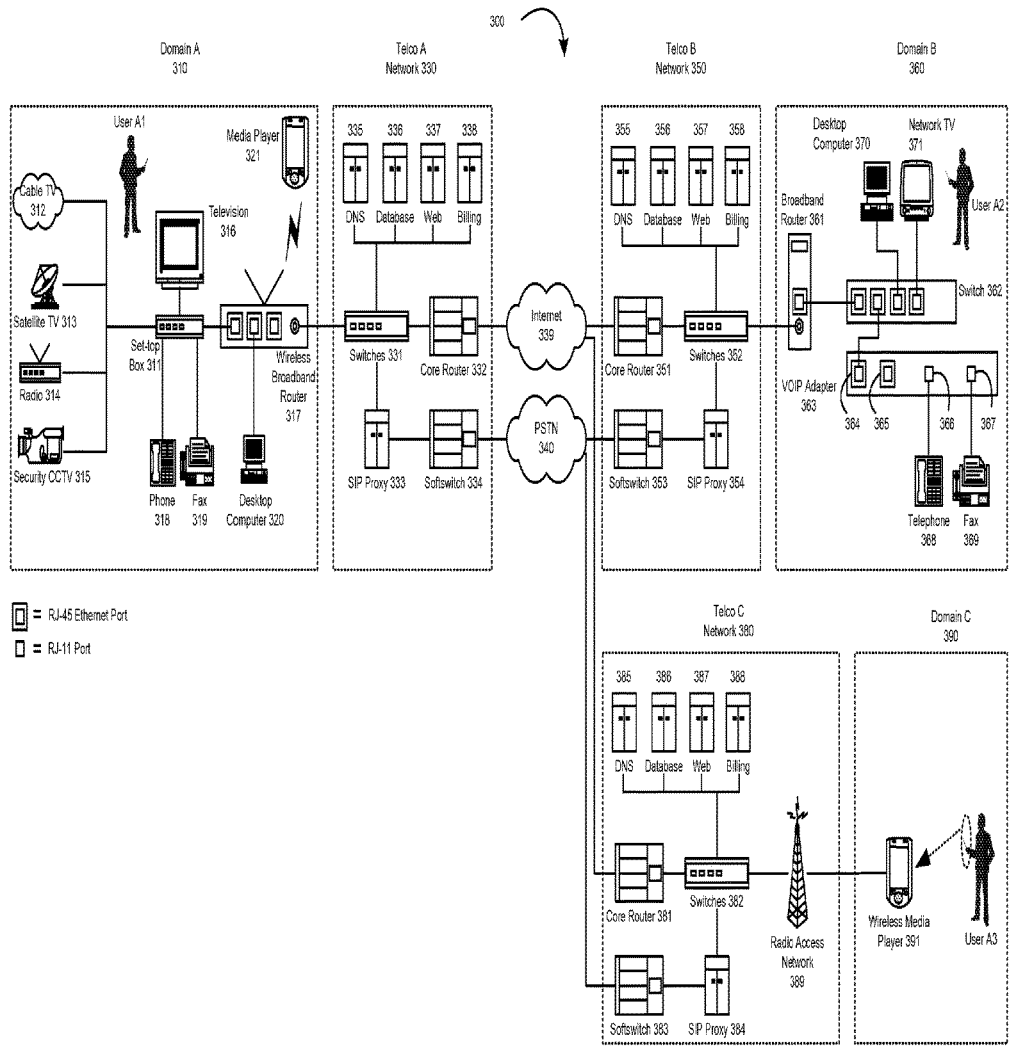
FIG. 3 is a functional network diagram depicting a set-top box with multiple signal inputs transmitting processed signals to multiple media devices locally and via the Internet in accordance with one embodiment of the present invention.

FIG. 3 is a functional network diagram of network 300 depicting a set-top box 311 with multiple signal inputs, transmitting processed signals to multiple media devices locally and via the Internet in accordance with one embodiment of the present invention. It should be noted that the diagram illustrated in FIG. 3 and described herein is meant to show one possible network configuration. In practice, network components and configurations can be altered while still remaining within the scope and spirit of the present invention.

To help illustrate the invention, FIG. 3 depicts a scenario where three members (A1, A2, A3) of a household (Domain A) are able to simultaneously access live media streams processed by a set-top box 311 from separate locations. The network connected set-top box 311 depicted in FIG. 3 is the set-top box embodied in this invention.

Represented within Domain A 310 is a wireless broadband router 317 with an integrated cable/DSL modem that provides Internet connectivity to devices on the network. The wireless broadband router 317 also functions as a network switch, and allows various devices to connect to it via its integrated Ethernet ports or through its wireless interface (e.g., 802.11 a/b/g). Connected to the broadband router 317 is a personal computer 320, a wireless media player 321 (which may be, for example, an Apple iPod-type device), and the set-top box 311 outlined herein. Connected to the set-top box 311 is an analog telephone 318 and fax machine 319 which are associated with separate E.164 phone numbers. The telephone 318 and fax 319 connect to separate RJ-11 ports integrated in the set-top box 311. As previously mentioned, the set-top box's integrated analog telephone adapter (ATA) functionality allows for the termination and origination of VOIP calls through a service provider's network. Also connected to the set-top box 311 is a HD TV 316. The TV 316 is connected to the set-top box 311 via HDMI. The set-top box 311 has multiple signal inputs including cable TV 312, satellite TV 313, AM/FM/SW/LW/HD/DAB/Satellite radio 314, and security CCTV 315. User A1 could access programming from these media sources on the television 316, the wireless media player 321, on the desktop computer 320, or on other media devices that connect to the LAN. These media devices could "discover" the set-top box 311 on the LAN using UPnP, Bonjour, or other such protocols. This would allow them to directly connect with the set-top box 311 and access available functionality.

The broadband router 317 in turn interfaces with Telco A's switch 331 via a direct connection. User A1's router 317 obtains its IP address and other network settings via a DHCP server on Telco A's network 330. The broadband router 317 in turn also functions as a DHCP server for User A1's network 310, assigning non-routable addresses to each of the connected devices and using NAT to route traffic to the devices and out to the Internet 339.

The set-top box 311 communicates with a SIP Proxy Server 333 on Telco A's network 330, that includes switches 331, core router 332, SIP proxy 333, Softswitch 334, DNS 335, database 336, web server 337, and billing server 338. The set-top box 311 and Telco A's SIP Proxy Server 333 use the Session Initiation Protocol (SIP) to enable VOIP and other multimedia services as contemplated herein.

SIP (RFC 3261) is a text-based application protocol that allows two endpoints in the Internet to discover one another in order to exchange context information about a session they would like to share. SIP is an application-layer control protocol that can establish, modify, and terminate multimedia sessions such as Internet telephony calls. SIP can also be used to invite participants to already existing sessions such as multicast conferences. SIP transparently supports name mapping and redirection services, which allows for personal mobility; users can maintain a single externally visible identifier regardless of their network location.

The SIP Proxy Server 333 on Telco A's network 330 provides the functionality of a SIP proxy, SIP redirect, SIP registrar, and SIP location services server. Note that the proxy, redirect, registrar, and location servers are logical roles that can be played by a single device in a network. For simplicity all are combined in FIG. 3 and represented as 333. The SIP Proxy Server 333 provides the foundation for call routing within SIP networks. It can interface with traditional SIP location services such as DNS or Electronic Numbering (ENUM), with feature servers (e.g., for voice mail, auto attendant, etc.), and with H.323 location services using standard Location Request (LRQ) messages. Cisco Systems, Inc. (San Jose, Calif.) offers a SIP proxy server similar to the one described herein.

The SIP Proxy Server 333 interfaces with a softswitch 334 on Telco A's network 330. The softswitch 334 provides call management functionality to Class 4 and Class 5 networks, and provides SIP-to-Signaling System 7 (SS7) gateway functionality for American National Standards Institute (ANSI) standardized networks. The softswitch 334 supports SIP user-agent functionality in conjunction with a packet voice media gateway. An example of a softswitch 334 is the BTS 10200 Softswitch from Cisco Systems, Inc.

The network illustrated in FIG. 3 and described herein is typical of a SIP-based VOIP network. These networks employ SIP for call signaling between the carrier's network 330 and the customer's VOIP adapter (set-top box) 311. As is common in these networks, the VOIP adapter 311 maintains a registration with a SIP registrar 333 on the provider's network 330. The SIP registrar's 333 address may have been pre-set in the set-top box 311 if the unit was issued by Telco A, or it could have been manually set by user A1 during the initial setup.

A SIP registrar 333 is a device that stores the logical location of user agents within that domain or subdomain. A SIP registrar server 333 stores the location of user agents and dynamically updates its data via REGISTER messages.

Registrars are specialized User Agent Servers that handle REGISTER requests. SIP devices like the set-top box 311 use REGISTER requests to dynamically register their current location, and this enables them to be contacted even if plugged into different networks.

REGISTER requests add, remove, and query bindings. A REGISTER request can add a new binding between an address-of-record and one or more contact addresses. The address-of-record is the SIP URI address associated with the set-top box or one of its offered service's (e.g., VOIP, video conferencing, storage, etc.). The contact address corresponds to the IP address of the set-top box 311. The registrar binds the SIP URI of the set-top box 311 or an offered service and the IP address of the device in a database that can be used, for example, by proxy servers on the service provider's network to locate the set-top box 311.

A client device can also remove previous bindings or query to determine which bindings are currently in place for an address-of-record. In accordance with the invention, the SIP compliant set-top box 311 described herein is capable of handling specific REGISTER requests on behalf of one or more offered services or other devices on the same local area network. If one of the services offered by the set-top box 311 is disabled or if one of the devices that registered through the set-top box is removed from the local network, the set-top box will automatically remove the relevant binding from the appropriate SIP registrar 333.

Registration of the set-top box 311 with the SIP registrar 333 allows the unit to terminate and originate a SIP session. For example, calls to User A1's E.164 phone number which originate over the Public Switched Telephone Network (PSTN) 340 or Internet 339 can be routed to the set-top box 311 so the call can be answered using the analog phone 318 connected to it.

Currently VOIP providers must maintain an interface to the circuit-switched PSTN 340 in order to route calls to and from other carriers. As all circuit-switched traffic is likely to migrate to packet networks such as the Internet 339 in the future, the need to maintain a PSTN interface will likely be eliminated. In the future, Electronic Numbering (ENUM) will also be used to resolve a fully qualified E.164 telephone number for a particular wireline or wireless device to a fully qualified domain name address using a DNS-based architecture. ENUM (RFC 3761) is the Internet Engineering Task Force (IETF) standard that defines a mechanism for using the Domain Name Service (DNS) as a tool to "discover" services associated with a telephone number (E.164 number).

According to a preferred embodiment of the invention, the set-top box 311 would be capable of initiating registrations for different services with a SIP registrar 333 on the service provider's network 330. Such registrations may be for services such as voice communication, fax communication, instant messaging, video conferencing, etc.

The set-top box 311 is also able to perform a SIP registration for a storage service, which in turn allows a user to remotely access media assets stored in the set-top box 311 using an E.164 number and ENUM. Such a method and system for accessing a storage device via the Internet is detailed in U.S. patent application Ser. No. 11/205,639 filed by the applicant of this invention. In that invention, a SIP registration automatically activates an ENUM-based storage service for the user. According to the invention, the user can in turn access media assets in a storage system (like the set-top box detailed herein) remotely over the Internet from supported media player devices using an E.164 number associated with the storage system. According to U.S. patent application Ser. No. 11/205,639, the ENUM-based storage service may alternatively be activated through the service provider's web site, call center, or other contact channels. In both cases, the service provider updates the user's ENUM record, thereby allowing the service to be accessed using the E.164 number. The full disclosure of U.S. patent application Ser. No. 11/205,639 is hereby incorporated by reference.

In accordance with this invention, the set-top box 311 is also able to perform a SIP registration for a "live media" service, which in turn allows a user to remotely access live media streams processed by the set-top box 311 using an E.164 number associated with the unit. Once the "live media" service is registered with the service provider's SIP registrar 333, the provider's database 336 is notified to activate the respective user's ENUM-based live media service. As mentioned earlier, ENUM is a suite of protocols to unify the telephone system with the Internet by using E.164 addresses with DNS. Electronic Numbering (ENUM) is a protocol developed in the Internet Engineering Task Force (IETF), RFC 2916 (and subsequent revisions) for fetching Universal Resource Identifiers (URIs) given an E.164 number. More simply put, ENUM is a technology that enables a user to store contact information that can be accessed by another person through the use of one E.164 number. For instance, one could store a fax, voice, e-mail, instant messenger, and other addresses all in a single ENUM Naming Authority Pointer (NAPTR) DNS Resource Record. By using ENUM, another person could access all the personal contact information contained within the NAPTR record. In accordance with U.S. patent application Ser. No. 11/205,639, the address of a personal storage system may be contained in the NAPTR. In accordance with this invention, the address of a live media processing device such as the set-top box embodied in this invention, may similarly be contained in the NAPTR.

E.164 is the name of the international telephone numbering plan administered by the International Telecommunication Union (ITU), which specifies the format, structure, and administrative hierarchy of telephone numbers. "E.164" refers to the ITU document that describes the structure of telephone numbers. The ITU issues country codes to sovereign nations, but administration of telephone numbers within each country is governed by that country's telecommunications regulatory agency. A fully qualified E.164 number is designated by a country code, an area or city code, and a phone number. For example, a fully qualified, E.164 number for the phone number 555-1234 in Washington, D.C. (area code 202) in the United States (country code 1) would be +1-202-555-1234.

In order to take advantage of ENUM, the telephone number is first assigned to a user by a telecom operator. The number can then be registered for one or more ENUM services. For example, a subscriber might wish to register an e-mail address or fax number to be associated with the same phone number. In accordance with the invention, the set-top box 311 initiates the automatic registration for the ENUM "live media" service that allows one or more of the user's assigned E.164 numbers to be used as a way to target and remotely connect with the set-top box 311 and access processed media streams from it.

In accordance with the invention, turning on the power to the set-top box 311 and connecting it to a network for the first time initiates the registration with Telco A's SIP registrar 333 and the automatic activation of the ENUM "live media" service that allows the user's E.164 number to be used as a way to target and remotely connect with the network set-top box 311. In an alternative embodiment, activation of the live media service is a manual process (e.g., where a user is required to first activate the live media service through the service provider's web site, Interactive Voice Response (IVR) system, call center, or other means). However the user chooses to set up these ENUM services, the information for the registered services, including the live media service detailed herein, are saved in NAPTR (Naming Authority Pointer) Resource Records. The NAPTR Resource Records are in turn updated with information specific to the live media service. Each NAPTR record contains one or more service-specific Uniform Resource Identifiers (URIs). In accordance with the invention, a NAPTR record associated with the live media service described herein will contain a valid enumservice field associated with the live media service.

The use of ENUM presupposes the collection of these records into a central or hierarchical service. Today, there exists an issue as to ownership of these ENUM DNS zones. In other words, it has not yet been decided which entity or entities will have the right to populate the e164.arpa domain with the URIs. For purposes of illustration, the discussion herein assumes that service providers will have the right to populate a collection of resource records associated with a DNS name. The domain "e164.arpa" is being populated in order to provide the infrastructure in DNS for storage of E.164 numbers. In order to facilitate distributed operations, this domain is divided into sub-domains.

Service providers can use an ENUM provisioning tool (represented in FIG. 3 as a component of the customer database 336) to add NAPTR records to the ENUM database for user's that have enrolled in the live media service. The ENUM provisioning system 336 can also be used to add NAPTR records in the ENUM database corresponding to other services associated with an E.164 phone number (e.g., voice, instant messenger, remote storage, etc.). The service provider's database 336 enforces rules for validating users, activating services/features, and other functions.

While e164.arpa appears to have been selected as the common international DNS root for ENUM DNS entries, there is a chance that once ENUM moves beyond the trial phase in many countries, a different domain could become the new standard. As such, references to e164.arpa throughout this document are not limiting and could be replaced with another root while still remaining within the scope of the present invention.

According to the above teachings of the present invention, the set-top box 311 separately registers an ENUM service for remote storage access and an ENUM service for live media access. In an alternate embodiment of the invention, a single ENUM service provides access to both functions, eliminating the need for separate NAPTR Resource Records. In such case, a single ENUM service is established for media devices like the set-top box 311 detailed herein. Using this alternate ENUM service, users may access a remote storage system, live media programming, and all other services enabled by the set-top box 311.

According to the teachings of the present invention, an E.164 phone number is used to target the set-top box 311 via the Internet from a remote media player device. If the set-top box 311 has multiple E.164 numbers assigned for voice and fax communication through the device, one or all of these E.164 numbers can also be used to access the live media service or other services enabled by the set-top box 311. Although a preferred embodiment, this invention is not necessarily limited to the use of E.164 phone numbers. Rather, the use of URIs and other address types that are capable of being translated to an Internet address is also possible for the purposes mentioned herein.

According to the invention a multiplicity of different media player devices can securely connect to the set-top box 311 via the Internet and receive live media streams processed by the system and access media assets stored within it. Media player devices may include, for example, music players (e.g., MP3 players, Apple iPod-like devices, stereos, "whole house" audio systems, etc.), game players, video players, desktop computers, notebook computers, tablet computers, cellular phones, personal digital assistants (PDAs), satellite television receivers, cable television receivers, digital video recorders (DVRs), DVD players, VCRs, network TVs, kiosks, phones, vehicle computer/audio systems, camcorders, digital cameras, peripheral devices, mobile radios, tuning devices, display devices, global positioning system (GPS) devices, etc. These devices can connect to the Internet using a wireless or wireline connection, have an integrated ENUM engine in accordance with the ENUM specifications, a built-in DNS resolver, and a hardware or software-based data input mechanism. In a preferred embodiment, set-top box 311 maintains all of the above-described functionality internally.

In accordance with the invention, the ENUM engine is a standard compliant resolution tool developed based on IETF's RFC 3761. The ENUM engine provides the DNS message processing and network transport mechanisms required to translate a telephone number into a set of ENUM records. The ENUM engine supports DNSSEC and TSIG to address a variety of security issues. The ENUM engine automatically processes NAPTR record(s) in DNS wire format into application service, order, preference, and URI fields. Additionally, the ENUM engine correctly parses the NAPTR service fields and dynamically interprets POSIX Extended Regular Expressions. The ENUM engine is capable of filtering the results based on application protocol and/or service type.

FIG. 3 shows additional media devices accessing live media programming processed by the set-top box 311. For example, user A2 is able to remotely access live media processed by the set-top box 311 connected to his home network (Domain A 310) from a desktop computer 370 or a network television 371 connected to his office LAN (Domain B 360). Both devices have an integrated ENUM engine in accordance with the ENUM specifications, a built-in DNS resolver, and a data input mechanism for entering an E.164 number.

The desktop computer 370 and network TV 371 are connected to an Ethernet switch 362 on User A2's office network 360. Also connected to the Ethernet switch 362 is a VOIP adapter 363, that includes ports 364, 365, 366, and 367, which in turn has a telephone 368 and fax 369 connected to the respective RJ-11 ports 366 367 in the unit. The Ethernet switch 362 connects to a broadband router 361, which interfaces directly with Telco B's network 350. The broadband router 361 facilitates access to the Internet 339 via Telco B's network 350. Telco B's network is comprised of switches 352, routers 351, SIP proxy servers 354, softswitches 353, and a variety of servers (e.g., DNS 355, Database 356, Web 357, Billing 358, etc.). The VOIP adapter 363 communicates with the SIP proxy server 354 on Telco B's network, and allows for the termination and origination of VOIP calls.

FIG. 3 additionally shows another member of the Domain A household accessing live media content processed by the set-top box 311 on a wireless media player 391. The media player 391 wirelessly connects to the Internet 339 through Telco C's Mobile Network 380. The Mobile Network 380 in the illustrated example is comprised of a radio access network 389, switches 382, routers 381, softswitches 383, SIP proxy servers 384, and various functional servers (e.g., DNS 385, database 386, web 387, billing 388, etc.). The Mobile Network 380 depicted in FIG. 3 and discussed herein is meant to show key components of a typical mobile operator network. In practice, different network components or configurations could be used.

As used in the present example, wireless media device 391 of user A3's network 390 is preferably a device that is capable of wirelessly connecting to the Internet 339 using wireless network protocols such as GSM/GPRS, CDMA2000, W-CDMA, EDGE, HDR, 1×RTT, UMTS, IMT-2000, 802.11a/b/g, IEEE 802.16 (WiMax), Ultra-Wide Band (UWB) or other relevant standards developed hereinafter. Preferably, wireless media device 391 has a display screen and a key pad for alphanumeric and special character data input.

According to the invention, user A2 could target and connect to the set-top box 311 using the E.164 number associated with the unit. The user could in turn access stored content or live media content processed by the set-top box 311 using his wireless media player 391.

Figure 4:
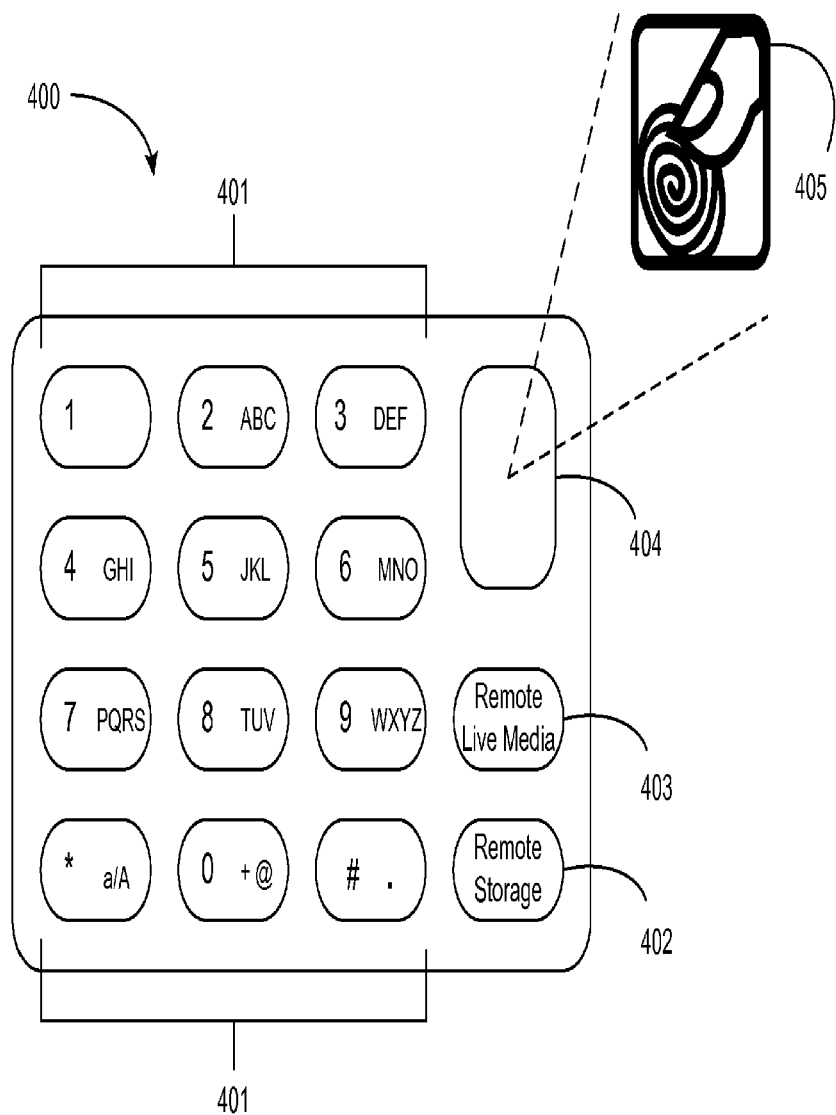
FIG. 4 is a representation of an exemplary hardware interface for a media device or its remote control according to a preferred embodiment of the present invention.

FIG. 4 is a representation of an exemplary hardware interface 400 that can be incorporated into any type of media player device or its remote control and used as a way to target and initiate connectivity with a set-top box (as described herein) via the Internet according to a preferred embodiment of the present invention. The "Remote Live Media" button 403 could be pressed by the user to activate a software program or routine on the device that initiates the process of connecting to a target set-top box like the one described. For example, in one embodiment, pressing the "Remote Live Media" button 403 may prompt the user in the device's display (not illustrated) for the E.164 number of the target set-top box to which connectivity is desired. The user can then utilize the key pad 401 to enter the E.164 number associated with the target set-top box. The key pad 401 can also be used to enter user IDs, PINs, passwords, or other security information needed for the set-top box to validate the user before providing access to live programming or allowing other operations to be performed by the user. The hardware interface 400 may also contain a biometric finger-print reader 404. The finger-print reader 404 could be utilized if the set-top box requires biometric authentication to validate the user. Icon 405 shows an individual pressing his finger on the reader 404 according to one embodiment.

The hardware interface represented in FIG. 4 does not need to be integrated in media player devices exactly as depicted in order to remain within the spirit and scope of the invention. For example, in an alternative embodiment, the "Remote Live Media" button 403 and the key pad 401 could be software-based (e.g., "soft-keys"). In yet another embodiment, the key pad 401 may be in the form of a QWERTY keyboard. Also, the biometric finger-print reader can be omitted altogether as user IDs with PINs or passwords may be preferred for securing remote access to the unit. Alternatively, other types of biometric components (e.g., retinal scanner, voice recognition system, etc.) could be incorporated in lieu of the finger-print reader 404. A voice recognition system could also obviate the need for manual activation of the "Remote Live Media" feature and input of an E.164 number and related security information via a hardware/software interface.

In an alternative embodiment, an E.164 number (for a target set-top box) and personal security information (e.g., User IDs, PINs, passwords, biometrics, etc.) are transmitted to the media device from another device (e.g., a cellular phone) using Radio Frequency Identification (RFID). This embodiment circumvents the need for a hardware interface 400 as represented in FIG. 4, and assumes the integration of RFID technology into the (connecting) media device as well as the cellular phone (or other initiating device) from which the E.164 number and security information are transmitted. Both devices may include a RFID Tag-Reader Module that is capable of functioning as a RFID tag and a RFID reader. In this embodiment, the RFID tag ID for the initiating device could have been registered with the set-top box and may in turn be transmitted with the target's E.164 number and security information to the media device. The media device may in turn transmit the RFID tag ID and other information to the set-top box upon establishing connectivity as part of a multi-factor authentication process.

According to yet another embodiment, the same E.164 number and security information can be transmitted to the media device from another device such as a cellular phone using infra-red or other wireless technology. A major short-range infra-red (IR) communications network protocol, defined by the Infra-red Device Association (IrDA), is known as the IrDA standard.

The set-top box can use a multi-factor authentication system that utilizes biometric data, personal identification numbers (PINs), username/passwords, answers to secret questions, software-based keys, hardware-based keys, digital certificates, token IDs (e.g., RFID), and other data.

In accordance with the invention, the set-top box also has the ability to initiate connections with other set-top boxes or media devices using the methods described herein. The set-top box's remote control has the features embodied in FIG. 4 and allows for the initiation of a connection with a remote media device for the purposes outlined herein.

Figure 5:
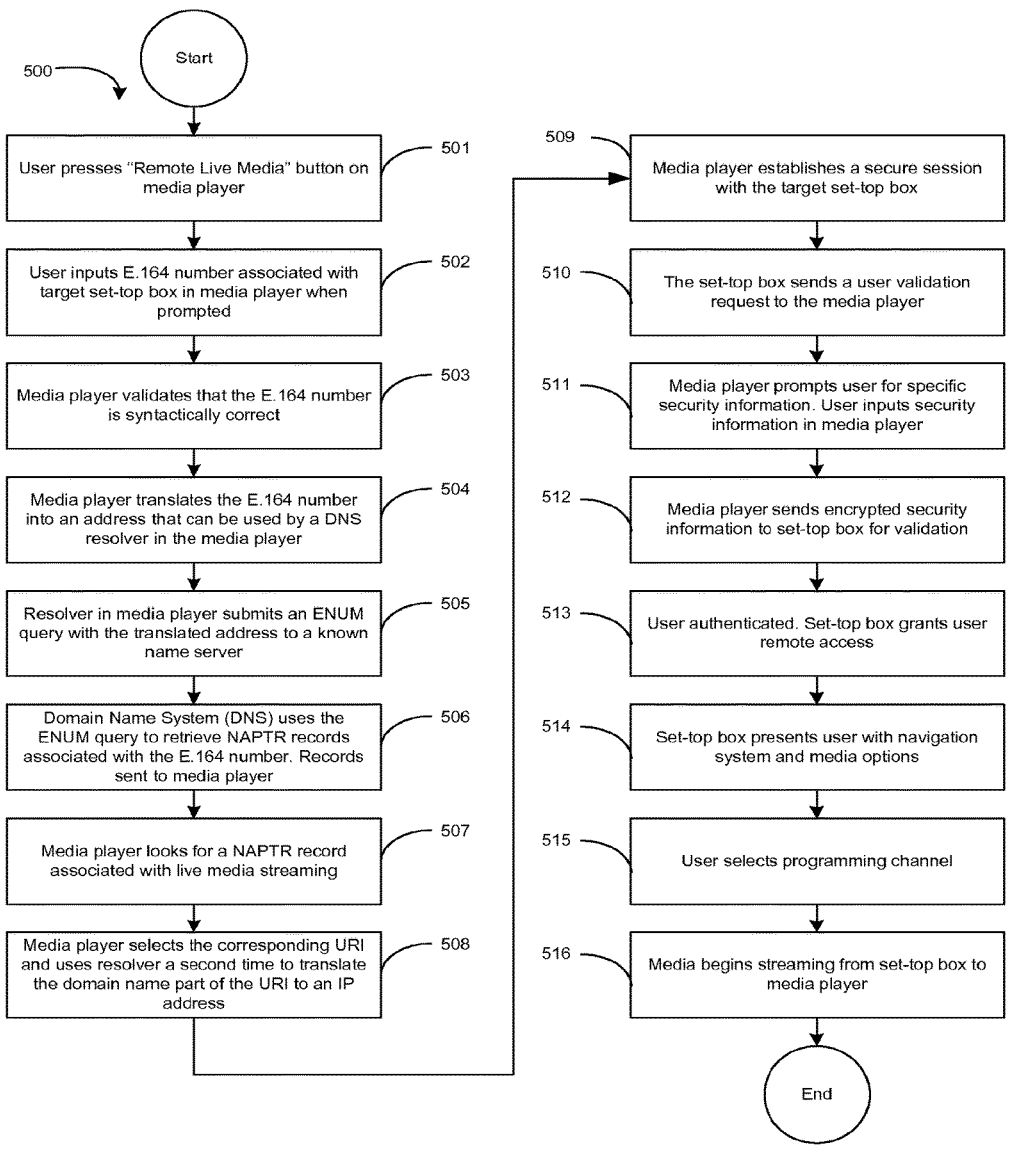
FIG. 5 is a flowchart illustrating the steps in the process of a media device accessing live programming processed by the set-top box via the Internet according to a preferred embodiment of the present invention.

FIG. 5 is a flowchart 500 illustrating the steps in the process of accessing a set-top box from a media player device via the Internet according to a preferred embodiment of the present invention. For illustrative purposes, assume that the media device accessing the set-top box is a network TV as depicted in FIG. 3. In step 501, User A2 presses the "Remote Live Media" button 403 in the hardware interface of the TV's remote control. Pressing the "Remote Live Media" button 403 activates a software program or routine in the TV that initiates the process of connecting to a target set-top box. A message on the TV's display prompts the user to input the E.164 phone number (using the remote control) of the target set-top box to which connectivity is desired. The set-top box may alternately display stored profiles (containing E.164 numbers) of set-top boxes which the user may select from.

In step 502, the user inputs the E.164 number associated with the target set-top box using the TV's remote control. In step 503, the network TV validates that the E.164 number is syntactically correct. Invalid E.164 numbers (e.g., those with too few digits, those beginning with an invalid number, etc.) will be rejected by the TV; in such instances, the user would be prompted to re-enter a valid number for the target set-top box. ENUM is only applicable for E.164 numbers. As an ENUM compliant device, a supported media device will only query DNS for what it believes is an E.164 number. Media devices may apply various validation routines on input E.164 numbers. An exemplary validation routine may be one that restricts the input of non-domestic phone numbers (e.g., numbers from countries outside the country the user is in). Media devices may also have the ability to make basic edits in order to ensure proper formatting.

After the TV validates the E.164 number, it must translate the number into an address that can be used by a DNS resolver in the TV (step 504). Because this address is based on a complete, international telephone number (for example, +12025551234), a unique Internet address exists for every unique phone number (assuming the ENUM database is populated). To determine if the number and address are registered in ENUM, the telephone number is translated in the following manner by the media device in step 504:

1. All characters with the exception of the digits are removed. Example:
12025551234
2. Dots (".") are added between each digit.
Example: 1.2.0.2.5.5.5.1.2.3.4
3. The order of the digits is reversed.
Example: 4.3.2.1.5.5.5.2.0.2.1
4. The string ".e164.arpa" is appended to the end.
Example: 4.3.2.1.5.5.5.2.0.2.1.e164.arpa This domain-name is used to request Naming Authority Pointer (NAPTR) resource records which may contain the end result or, if the flags field is blank, produces new keys in the form of domain-names from the DNS. The TV interacts with the domain name space through its built in resolver. The resolver has knowledge of at least one name server (likely on the service provider's network). In most implementations, the network TV will automatically obtain the name server address via DHCP. The TV resolver can be configured with multiple name servers.

When the resolver processes an ENUM query it asks a known name server for the information (step 505). In return, the resolver either receives the desired information or a referral to another name server. Using these referrals, the resolver learns the identities and contents of other name servers. The resolver may have to make several queries to several different external name servers to answer a particular user query, and hence the resolution of an ENUM query may involve several network accesses and an arbitrary amount of time.

The next step in the overall process of the present invention in a preferred embodiment calls for the retrieval of a NAPTR record (step 506). According to RFC 3761, the domain naming system uses the ENUM query to retrieve a NAPTR record associated with the E.164 number. The DNS response to the ENUM query contains one or more NAPTR records corresponding to the E.164 number, and each NAPTR record contains one or more service-specific Uniform Resource Identifiers (URIs).

Thus, for the example ENUM name query given above, the following NAPTR records might be received:

ing one NAPTR resource record from another. A media device, like the TV mentioned in the current example, can select the corresponding URI and use the resolver a second time to translate the domain name part of the URI to an IP address using the URI-specific DNS resource record as a query term (step 508). The media device can then use the full URI and appropriate service port to initiate a secure session with the remote set-top box (step 509). Referring to FIG. 3, when Telco A's proxy server 333 receives an INVITE request addressed to the set-top box's URI, the request will be proxied to the Contact URI of the registered set-top box 311. This allows the TV 371 and the target set-top box 311 to establish a secure session.

The packet format of the NAPTR RR is found in section 4 of RFC 4303. Examples of NAPTR records are shown below:

| Order | Pref. | Flags | Services | Regexp | Replacement |
|---|---|---|---|---|---|
| IN NAPTR | 100 | 10 | "u" | "E2U+sip" | "!^.*$!sip:client25@telco.com!" |
| IN NAPTR | 103 | 10 | "u" | "E2U+livemedia" | "!^.*$!sip:client25@livemedia.telco.com!" |

NAPTR fields contain numerous components:

An Order field to specify the order in which multiple NAPTR records must be processed;

A Preference field to determine the processing order when multiple records have the same order value;

A Service field to specify the resolution protocol and service;

Flags to modify the actions of further DNS lookups;

A Regular Expression to allow the query client to rephrase the original request in a DNS format; and A Replacement field to define the next DNS query object.

The flag "u" denotes a terminal lookup that will result in the production of a URI by the regular expression substitution specified. The "E2U+livemedia" specifies a service to be contacted by SIP through the use of an E.164 to URI (E2U) translation. The substitution "!^$!client25@livemedia.telco.com!" is then applied to the original phone number (such as +12025551234) to yield the result sip:client25@livemedia.telco.com, which is used to resolve SIP addresses.

The replacement string is the resultant string ("sip:client25@livemedia.telco.com"), which is to be used to initiate the SIP communication with the target set-top box (see step 509).

Enumservice registrations must be made with the IANA. A complete registration will include the proposed "enumservice" field, the URI schemes, a functional specification, security considerations, intended usage, and any other information intended to allow for the interoperability within ENUM. Service Registration requirements are outlined in RFC 3761.

According to the teachings of the present invention, the "enumservice" field outlined herein is used to represent a $ORIGIN 4.3.2.1.5.5.5.2.0.2.1.e164.arpa.
IN NAPTR 100 10 "u" "E2U+sip"        "!^.*$!sip:client25@telco.com!".
IN NAPTR 103 10 "u" "E2U+livemedia"  "!^.*$!sip:client25@livemedia.telco.com!".

In step 507, the TV's ENUM engine will look for a NAPTR record associated with the "live media" service. The registered E2U+livemedia' enumservice functions as a selection mechanism for media player devices when chooslive media service. Traditionally, the services field of a NAPTR record (as defined in RFC 3403) contains a string that is composed of two subfields: a 'protocol' subfield and a 'resolution service' subfield. ENUM in particular defines an 'E2U' (E.164 to URI) resolution service and a service 'Type' that is registered with the IANA. Note that the token "sip" that is shown as an example above is a Type registered with the IANA. The Type "livemedia" however, is shown for illustrative purposes. The Types have no implicit connection with the protocols or URI schemes even though they can bear the same name.

According to the teachings of the present invention, the 'E2U' resolution service is used in conjunction with a Type that represents a device capable of streaming live media. For example, an 'E2U+livemedia' enumservice that indicates the presence of a network media device capable of processing and streaming live media may be used. While the example above uses the theoretical "livemedia" Type, the actual label that is registered with the IANA for this purpose could be different. The service parameters including guidelines for the Type field can be found in section 2.4.2 of RFC 3761. The 'type' must be unique and comply with other naming requirements outlined in section 3.1.2 of RFC 3761.

The scheme of the URI that will appear in a NAPTR record using the 'E2U+livemedia' enumservice may be either 'SIP' or 'SIPS'. In accordance with the invention, the use of application protocols other than SIP and SIPs in conjunction with an enumservice intended for the purposes herein is also possible.

According to U.S. patent application Ser. No. 11/205,639 filed by the applicant of this invention, and which is incorporated by reference herein, an enumservice that represents a storage device or service was previously proposed (e.g., 'E2U+storage'). As the set-top box detailed herein provides remote access to stored media assets as well as live programming using an E.164 number and ENUM, an alternate embodiment of the invention calls for the use of a single enumservice (e.g., 'E2U+mediadevice') that provides remote access to all the features of a set-top box or similar media devices as described herein, including access to live media programming (time warped and non-time warped) and stored media assets.

The ultimate result of the sequence of DNS queries is the specification of a protocol, an associated port address, and the IP address for a preferred server for the service.

According to a preferred embodiment, the resolved Internet address is used to establish secure real-time communication between the TV 371 and the set-top box 311 using the Session Initiation Protocol (SIP). SIP was developed by the IETF as part of the Internet Multimedia Conferencing Architecture, and was designed to dovetail with other Internet protocols such as Transmission Control Protocol (TCP), Transmission Layer Security (TLS), User Datagram Protocol (UDP), Internet Protocol (IP), Domain Name System (DNS), and others. SIP works with both IPv4 and IPv6.

While the use of SIP for such purposes is preferred, alternative application protocols may be used in lieu of SIP while still remaining within the spirit and scope of the present invention.

The use of SIP for establishing secure communication with a remote set-top box is preferred as mobile operators and other communications providers are moving towards a SIP-based architecture for voice and other multimedia services. The use of SIP for communication with a set-top box like the one described herein leverages the same SIP registrar, proxy, redirect, and location servers used to deliver real-time, interactive, converged communication services (e.g., voice, video, etc.).

Connectivity between a media device and target set-top box 311 may use end-to-end encryption (e.g., AES, DES, Triple DES, Blowfish, Serpent, Mars, etc.).

During step 509, the set-top box and the connecting media device exchange media processing capabilities and settings. In accordance with the invention, this allows the set-top box to convert media streams to formats suitable for viewing/listening on the receiving media device.

After establishing connectivity, the set-top box sends a request to the media device for a user ID, PIN, password, biometric ID, RFID token ID or other security information (step 510). In step 511, the media device processes the request and displays a message prompting the user for the specific security information. The user in turn uses the media device's hardware/software interface or its remote control to input the required security information.

In step 512, the media device sends the encrypted security information to the set-top box for validation. If the security information is positively validated by the set-top box, the user is authenticated in step 513. The set-top box in turn grants the user remote access to available live media programming.

In accordance with the invention, in step 514, the media device only displays available media source options from the set-top box that can be processed by the media device. In accordance with the invention, media that cannot be processed by the media device are omitted from the view of available media sources.

The user can then navigate through the list of live media sources available through the remote set-top box using the TV's user interface and display screen. In step 515, the user can select a specific live media source option and further select specific programming available through that media source. In accordance with the invention, a program guide associated with the media source that is selected is transmitted from the set-top box to the receiving media device. Embodiments of the invention allow a user to navigate the program guide and select specific programming for transmission using the media device's remote control or other user interface.

In the current example, the user selects "satellite television" as the media source, and then selects a channel (e.g., CNN) he/she would like to remotely view on the television.

In step 516, the selected live programming begins transmitting to the network TV. In the current example, the television programming is streamed over the Internet to the network TV. In accordance with the invention, the user can select multiple live programming channels to have streamed to the network TV, and be able to view them all using the picture-in-picture (PIP) feature of the TV.

Figure 6:
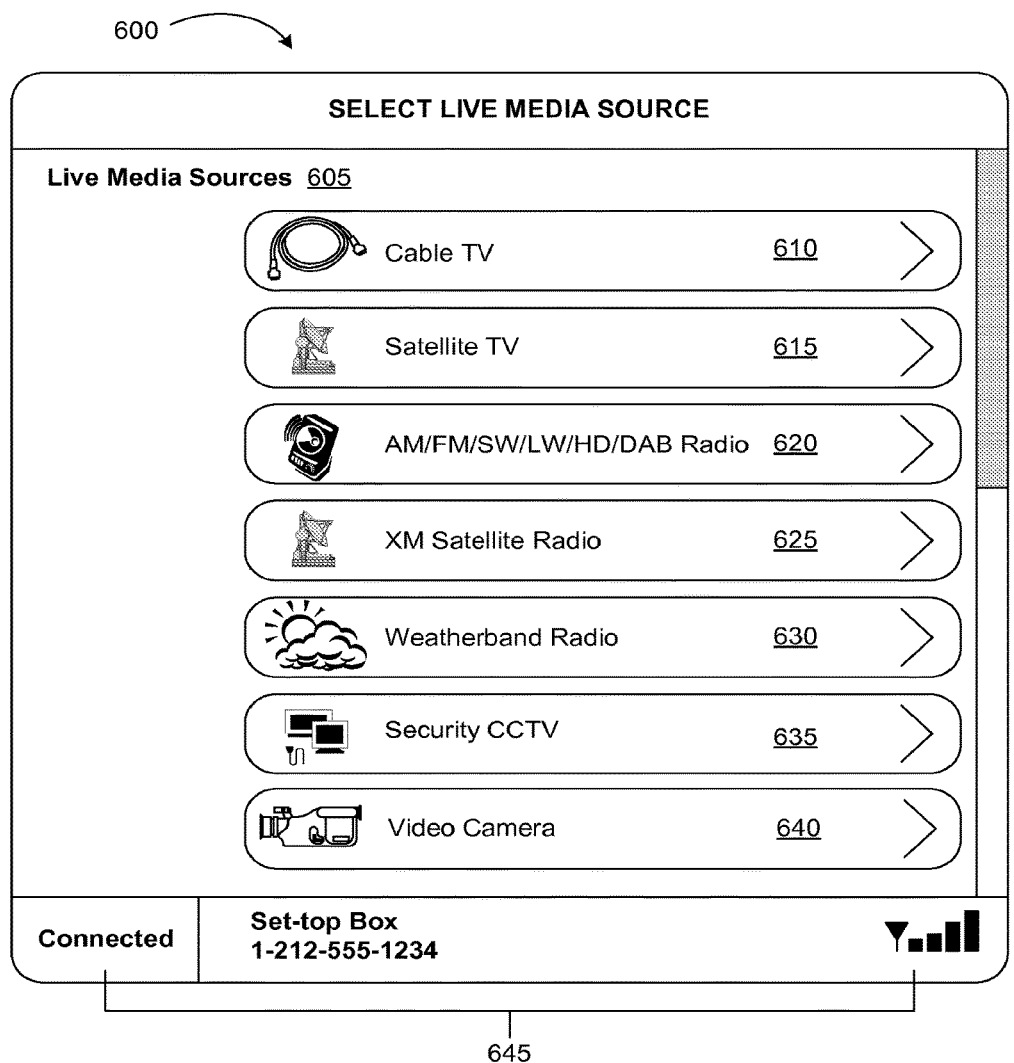
FIG. 6 is an illustration of an exemplary user interface screen depicting options for live media sources that can be selected in order to further select specific programming for transmission to a connected media device, according to a preferred embodiment of the present invention.

FIG. 6 is an illustration of an exemplary user interface screen depicting options for live media sources that can be selected in order to further select specific programming for transmission to a connected media device, according to a preferred embodiment of the present invention. The exemplary user interface screen 600 is presented to the user in the display of the initiating media device after the user has been authenticated (at step 514 of FIG. 5). The user interface screen 600, in a preferred embodiment, displays live media source options 605 for each of the signal inputs processed by the set-top box, and capable of being processed by the receiving media device. The exemplary user interface screen 600 shows the following seven live media source options 605 which correspond to the signal inputs received and processed by the set-top box in the example: Cable TV 610, Satellite TV 615, AM/FM/SW/LW/HD/DAB Radio 620, XM Satellite Radio 625, Weatherband Radio 630, Security CCTV 635, Video Camera 640. The user can use the hardware/software controls of the receiving media device to select any of the live media source options 605 presented.

Once a live media source is selected, the user is presented with a program guide, if one is available, for the selected live media source. The program guide may be one that is generated by the service provider (e.g., cable TV company, satellite TV provider, satellite radio provider, etc.) and made available to the set-top box through the incoming signal. The set-top box is also capable of generating a program guide itself for certain media sources if some programming information is contained within the received signal. The user can use whatever program guide the set-top box makes available for the media source option in order to select specific programming to be transmitted to the user's media device.

The bottom of the exemplary user interface screen 600 in FIG. 6 contains a status bar 645 that provides information on the communications link between the set-top box and the connecting media device. For example, the exemplary screen shows that the media device is "connected" to a set-top box associated with a particular E.164 number (1-212-555-1234). The status bar 645 also provides information on the signal strength between the two devices. The signal strength indicator factors in a combination of network parameters including packet loss, latency, throughput, etc. Additional information related to connectivity between the two devices could also be displayed and updated in real-time within the status bar 645.

As previously mentioned, the set-top box detailed herein provides remote access to stored media assets as well as live programming using an E.164 number and ENUM. It was also mentioned that in one embodiment of the invention, separate NAPTR records with unique enumservice fields are used to distinguish between the feature for remote access to live programming and remote access to stored media assets. A unique enumservice field for remote access to live programming is proposed in this invention. A unique enumservice field for remote access to stored media assets was proposed in U.S. patent application Ser. No. 11/205,639 filed by the Applicant. According to the present invention, separate enumservice fields corresponding to other services or features enabled by the set-top box could also be used. Connectivity established with the set-top box as a result of the selection of a specific enumservice from the NAPTR record, would result in the user only having access to that corresponding service on the set-top box.

In an alternate embodiment of this invention, it is proposed that a single enumservice field (e.g., 'E2U+mediadevice') be used to provide remote access to all the features of a set-top box or a similar media device, including access to live media programming and stored media assets. In such case, the interface presented in FIG. 4 may only have a single button for "remote media device" instead of displaying separate buttons corresponding to individual features of the set-top box such as "remote live media" 403 and "remote storage" 402 as were previously described. The flowchart outlined in FIG. 5 would in turn be modified such that the button pressed in step 501 would be the "remote media device" button. Furthermore, Step 507 would be modified so the initiating media player looks for a NAPTR record containing an enumservice field associated with such media devices (e.g., 'E2U+mediadevice'). Finally Step 514 would be modified so that the set-top box described herein presents the user with a menu that provides access to all of the device's functionality, such as the ability to set media recording schedules for any of the input signals (television, radio, etc.), the ability to check voice/video mail saved on the set-top box, the ability to check caller ID logs, the ability to check a user's calendar stored on the set-top box, the ability to access various types of media programming, etc.

Figure 7:
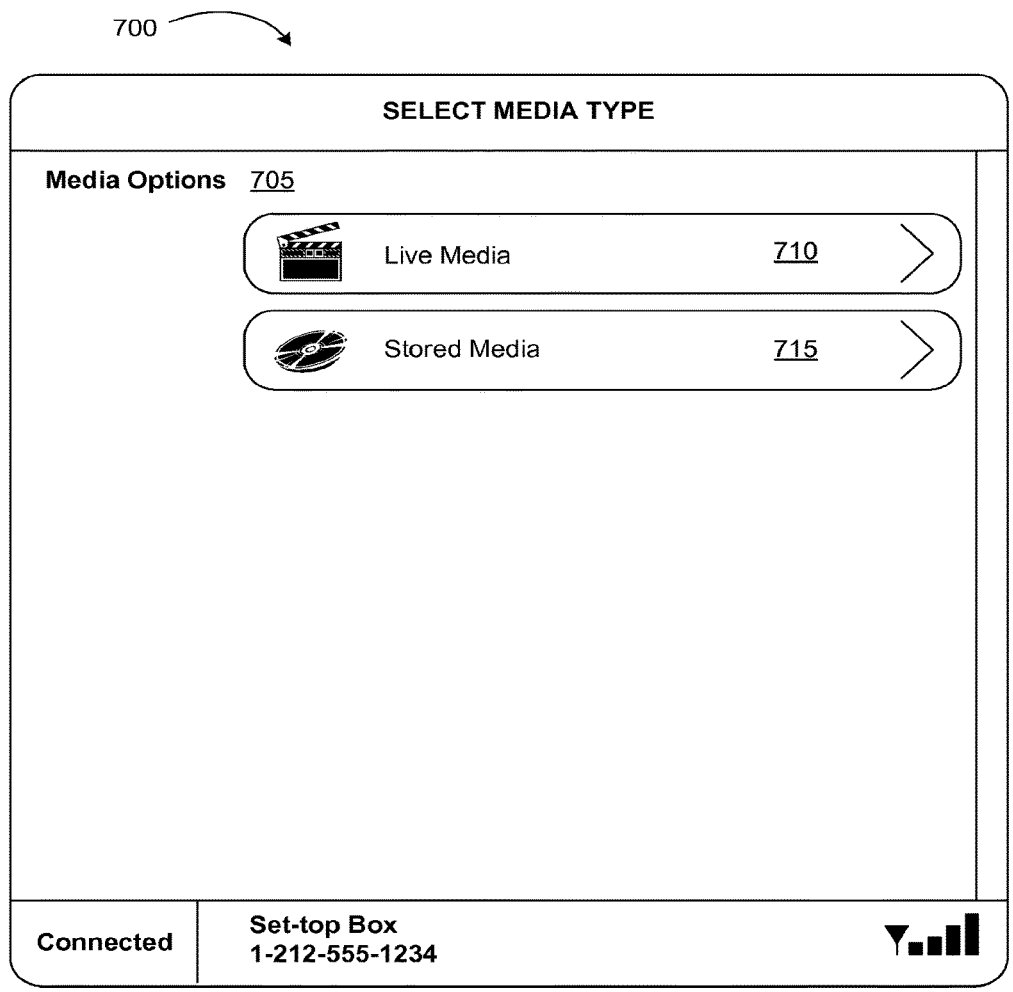
FIG. 7 is an illustration of an exemplary user interface screen depicting options for media types that can be selected in order to further select specific content for transmission to a connected media device, according to an alternative embodiment of the present invention.

FIG. 7 is an illustration of an exemplary user interface screen depicting options for media types that can be selected in order to further select specific content for transmission to a connected media device, according to this alternative embodiment of the present invention. The exemplary user interface screen 700 would be presented to the user in the display of the initiating media. The user interface screen 700 in a preferred embodiment displays media options 705 from which the user can select content to be streamed to the initiating device. The exemplary user interface screen 700 shows an option for live media programming 710 and an option for stored media 715. Selecting the Live Media 710 option would result in the display of all available media sources from where live programming is available. Such an exemplary user interface is represented in FIG. 6, which was previously discussed. If the user selects the Stored Media 715 option, the user will be presented with a listing of stored media assets contained on the hard disk, DVD/CD, SD card, or available through other storage components of the set-top box. The user can in turn select any stored media asset for transmission to the initiating media device.

While this invention has been described in terms of several preferred embodiments, there are alterations, permutations, and equivalents, which fall within the scope of this invention. For example, although the invention has been described in terms of a set-top box 100, it should be appreciated that certain features of the invention may also be applied to other types of electronic devices (e.g., music players, video players, game players, televisions, display devices, DVR/PVRs, VCRs, receivers/tuners, DVD players, radios, personal computers, routers, switches, and the like). It is therefore intended that the following appended claims be interpreted as including all such alterations, permutations, and equivalents as fall within the true spirit and scope of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A computing device, comprising:
   a wireless transceiver configured to communicate wirelessly with a data network;
   a processor to exchange media processing capabilities with a media player device connected to the computing device, the computing device being removably connectable to the media player device, and to generate a user interface according to the received media processing capabilities of the media player device, the user interface being configured to be displayed at the media player device to display a list of data available from a streaming device, to receive a user input to select data from the displayed list, the processor being configured to stream the selected data between the streaming device and the computing device; and
   an external biometric characteristic reader that receives user characteristic data to verify a user's identity,
   wherein:
   the computing device is configured to stream the selected data between the streaming device and the computing device via the wireless transceiver and the data network based on verification of the user's identity, for display at the media player device; and the user interface is configured to filter the displayed list of available data according to the received media processing capabilities of the media player device to omit data that cannot be processed by the media player device.

2. The computing device of claim 1, wherein the data network is the Internet, and the streaming device is connected to the Internet to perform at least one of sending and receiving streamed data over the Internet.

3. The computing device of claim 2, wherein the wireless transceiver includes a cellular transceiver, and the wireless transceiver is configured to perform at least one of sending and receiving of data over the Internet via a cellular network.

4. The computing device of claim 1, wherein the data network is an Internet Protocol (IP) network, and the wireless transceiver is configured to perform at least one of sending and receiving of the data over the IP network using a routable address of the streaming device.

5. The computing device of claim 1, wherein the wireless transceiver is configured to communicate with the data network using at least one of Wi-Fi and Bluetooth protocols.

6. The computing device of claim 1, wherein the data streamed between the streaming device and the computing device includes at least one of audio and video data.

7. The computing device of claim 1, wherein the data streamed between the streaming device and the computing device includes live video data.

8. A computing system, comprising:
a streaming device in communication with a data network;
a media player device; and
a computing device that removably connects to the media player device, the computing device comprising:
a wireless transceiver configured to communicate wirelessly with the data network,
a processor to exchange media processing capabilities with the media player device and to generate a user interface according to the received media processing capabilities of the media player device, the user interface being configured to be displayed at the media player device to display a list of data available from the streaming device, to receive a user input to select data from the displayed list, the processor being configured to stream the selected data between the streaming device and the computing device; and
an external biometric characteristic reader configured to receive user characteristic data to verify a user's identity,
wherein:
the computing device is configured to stream the selected data between the streaming device and the computing device via the wireless transceiver and the data network based on verification of the user's identity, for display at the media player device; and
the user interface is configured to filter the displayed list of available data according to the received media processing capabilities of the media player device to omit data that cannot be processed by the media player device.

9. The computing system of claim 8, wherein the data network is the Internet, and the streaming device is connected to the Internet to perform at least one of sending and receiving streamed data over the Internet.

10. The computing system of claim 9, wherein the wireless transceiver includes a cellular transceiver, and the wireless transceiver is configured to perform at least one of sending and receiving of data over the Internet via a cellular network.

11. The computing system of claim 8, wherein the data network is an Internet Protocol (IP) network, and the wireless transceiver is configured to perform at least one of sending and receiving of data over the IP network using a routable address of the streaming device.

12. The computing system of claim 8, wherein the wireless transceiver is configured to communicate with the data network using at least one of Wi-Fi and Bluetooth protocols.

13. The computing system of claim 8, wherein the data streamed between the streaming device and the computing device includes at least one of audio and video data.

14. The computing system of claim 8, wherein the data streamed between the streaming device and the computing device includes live video data.

15. A method, comprising:
exchanging media processing capabilities between a computing device and a media player device that the computing device removably connects thereto;
generating a user interface at the computing device according to the received media processing capabilities of the media player device, the user interface being displayed at the media player device to display a list of data available from a streaming device in communication with a data network;
filtering the displayed list of available data according to the received media processing capabilities of the media player device to omit data that cannot be processed by the media player device;
receiving a user input at the user interface to select data from the displayed list, and to stream the selected data between the computing device and the streaming device, the computing device being in wireless communication with the streaming device via the data network, and the user interface being displayed on the media player device via the wireless connection;
receiving, by an external biometric characteristic reader, a biometric characteristic of a user;
verifying an identity of the user based on the biometric characteristic of the user; and
wirelessly streaming the selected data between the streaming device and the computing device via a wireless transceiver of the computing device based on the verifying the identity of the user, for display at the media player device.

16. The method of claim 15, wherein the data network is the Internet, and the streaming device is connected to the Internet to perform at least one of sending and receiving streamed data over the Internet.

17. The method of claim 16, wherein the computing device includes a cellular transceiver, and the computing device performs at least one of sending and receiving streamed data over the Internet via a cellular network.

18. The method of claim 15, wherein the data network is an Internet Protocol (IP) network, and the wireless transceiver is configured to perform at least one of sending and receiving streamed data over the IP network using a routable address of the streaming device.

19. The method of claim 15, wherein the computing device communicates with the streaming device over the data network using at least one of Wi-Fi and Bluetooth protocols.

20. The method of claim 15, wherein the data streamed between the streaming device and the computing device includes at least one of audio and video data.

21. The computing device of claim 1, wherein the media player device includes the biometric characteristic reader.

22. The computing system of claim 8, wherein the media player device includes the biometric characteristic reader.

23. The method of claim 15, further comprising:
    receiving the biometric characteristic from the media player device.

* * * * *